US011642271B2

United States Patent
Ortlieb et al.

(10) Patent No.: US 11,642,271 B2
(45) Date of Patent: May 9, 2023

(54) MODULAR AND MINIMALLY CONSTRAINING LOWER LIMB EXOSKELETON FOR ENHANCED MOBILITY AND BALANCE AUGMENTATION

(71) Applicant: ECOLE POLYTECHNIQUE FEDERALE DE LAUSANNE (EPFL), Lausanne (CH)

(72) Inventors: Amalric Ortlieb, Colombier (CH); Mohamed Bouri, Chavannes-Renens (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 291 days.

(21) Appl. No.: 16/339,459

(22) PCT Filed: Oct. 4, 2017

(86) PCT No.: PCT/IB2017/056112
§ 371 (c)(1),
(2) Date: Apr. 4, 2019

(87) PCT Pub. No.: WO2018/065913
PCT Pub. Date: Apr. 12, 2018

(65) Prior Publication Data
US 2019/0254908 A1 Aug. 22, 2019

(30) Foreign Application Priority Data
Oct. 4, 2016 (EP) .................................... 16192217

(51) Int. Cl.
*A61H 3/00* (2006.01)
*A61H 1/02* (2006.01)

(52) U.S. Cl.
CPC ............ *A61H 1/024* (2013.01); *A61H 1/0237* (2013.01); *A61H 1/0244* (2013.01);
(Continued)

(58) Field of Classification Search
CPC ........ A61H 1/024; A61H 1/027; A61H 1/0244; A61H 1/0266; A61H 2003/007;
(Continued)

(56) References Cited

U.S. PATENT DOCUMENTS 7,628,766 B1 * 12/2009 Kazerooni ................ A61F 5/00
602/16
9,713,439 B1 * 7/2017 Wu ........................... A61B 5/11
(Continued)

FOREIGN PATENT DOCUMENTS

| EP | 2982482 | 2/2016 |
|---|---|---|
| FR | 2981266 | 4/2019 |

(Continued)

OTHER PUBLICATIONS

International Search Report prepared by the European Patent Office dated Jan. 11, 2018, for International Application No. PCT/IB2017/056112.
(Continued)

*Primary Examiner* — Timothy A Stanis
(74) *Attorney, Agent, or Firm* — Sheridan Ross P.C.

(57) ABSTRACT

In one embodiment, the exoskeleton structure is fastened to the body of the user by a brace and at the foot level. The exoskeleton includes at least one set of three joints corresponding to the hip abduction/adduction, the hip flexion/extension and the knee flexion/extension, wherein the architecture of the exoskeleton is compatible with a set of different removable, adaptable and backdrivable actuation units dedicated to each joints and remotely located around the trunk of the user to decrease inertia and mass on the
(Continued)

distal segments, wherein each joint can be modularily let free, constrained by a visco-elastic mechanism or actuated by one corresponding actuation unit.

19 Claims, 12 Drawing Sheets

(52) U.S. Cl.
CPC ............ *A61H 1/0266* (2013.01); *A61H 3/00* (2013.01); *A61H 2003/007* (2013.01); *A61H 2201/018* (2013.01); *A61H 2201/1215* (2013.01); *A61H 2201/164* (2013.01); *A61H 2201/165* (2013.01); *A61H 2201/1628* (2013.01); *A61H 2201/1676* (2013.01); *A61H 2201/5053* (2013.01); *A61H 2201/5061* (2013.01); *A61H 2201/5069* (2013.01); *G05B 2219/40305* (2013.01)

(58) Field of Classification Search
CPC ................ A61H 3/00; A61H 2201/018; A61H 2201/1215; A61H 2201/1628; A61H 2201/164; A61H 2201/165; A61H 2201/1676; A61H 2201/5053; A61H 2201/5061; A61H 2201/5069

See application file for complete search history.

(56) References Cited

U.S. PATENT DOCUMENTS

| | | | |
|---|---|---|---|
| 2004/0102723 A1* | 5/2004 | Horst | ..................... A61H 3/008 601/5 |
| 2010/0016766 A1* | 1/2010 | Zhang | .................. A61H 1/0281 601/5 |
| 2011/0257764 A1 | 10/2011 | Herr et al. | |
| 2013/0289452 A1 | 10/2013 | Smith et al. | |
| 2014/0330431 A1 | 11/2014 | Hollander et al. | |
| 2015/0134078 A1 | 5/2015 | Amundson et al. | |
| 2015/0272811 A1* | 10/2015 | Choi | ..................... B25J 9/0006 623/27 |
| 2015/0351995 A1 | 12/2015 | Zoss et al. | |
| 2017/0119551 A1 | 5/2017 | Huang et al. | |

FOREIGN PATENT DOCUMENTS

| | | |
|---|---|---|
| KR | 10-2017-0027187 | 3/2017 |
| WO | WO 2010/027968 | 3/2010 |
| WO | WO 2014/057410 | 4/2014 |
| WO | WO 2015/140353 | 9/2015 |
| WO | WO 2018/065913 | 4/2018 |

OTHER PUBLICATIONS

Written Opinion prepared by the European Patent Office dated Jan. 11, 2018, for International Application No. PCT/IB2017/056112.
"Ekso Bionics Bestowed With CE Mark," BioSpace.com, May 17, 2012, 6 pages.
"Neurological Disorders: public health challenges," World Health Organization, 2006, 232 pages.
"TUV Rheinland Issues EC certificate for Cyberdyne's Medical Robot Suit HAL®," TUVRheinland®, Aug. 7, 2013, 1 page.
Baud et al. "HiBSO hip exoskeleton: Toward a wearable and autonomous design," Springer, Cham., International Workshop on Medical and Service Robots, Jul. 2016, pp. 185-195.
Blackwell et al. "Summary health statistics for U.S. adults: National Health Interview Survey, 2012," National Center for Health Statistics, Vital and Health Statistics, Nov. 2014, Series 10, N. 2260, 171 pages.
Bohannon "Comfortable and maximum walking speed of adults aged 20-79 years: reference values and determinants," Age and Ageing, 1997, vol. 26, No. 1, pp. 15-19.

Emery "Population Frequencies of Inherited Neuromuscular Diseases—A World Survey," Neuromuscular Disorders, 1991, vol. 1, No. 1, pp. 19-29.
Kerrigan et al. "Reduced Hip Extension During Walking: Healthy Elderly and Fallers Versus Young Adults," Archives of Physical Medicine and Rehabilitation, Jan. 2001, vol. 82, No. 1, pp. 26-30.
Mak et al. "Joint torques during sit-to-stand in healthy subjects and people with Parkinson's disease," Clinical Biomechanics, 2003, vol. 18, No. 3, pp. 197-206.
Morrow et al. "Accelerations of the Waist and Lower Extremities over a Range of Gait Velocities to Aid in Activity Monitor Selection for Field-Based Studies," Journal of Applied Biomechanics, Aug. 2014, vol. 30, No. 4, pp. 581-585.
Olivier et al. "Mechanisms for actuated assistive hip orthoses," Robotics and Autonomous Systems, 2015, vol. 73, pp. 59-67.
Ortlieb et al. "From gait measurements to design of assistive orthoses for people with neuromuscular diseases," IEEE, 2015 IEEE International Conference on Rehabilitation Robotics (ICORR), pp. 368-373.
Ortlieb et al. "AUTONOMYO: Design Challenges of Lower Limb Assistive Device for Elderly People, Multiple Sclerosis and Neuromuscular Diseases," Wearable Robotics: Challenges and Trends, Proceedings of the 2nd International Symposium on Wearable Robotics, WeRob2016, Oct. 18-21, 2016, Segovia, Spain, pp. 439-443.
Ortlieb et al. "An Assistive Lower Limb Exoskeleton for People with Neurological Gait Disorders," IEEE, 2017 International Conference on Rehabilitation Robotics (ICORR), Jul. 17-20, 2017, London, UK, pp. 441-446.
Ounpuu "The Biomechanics of Walking and Running," Clinics In Sports Medicine, Oct. 1994, vol. 13, No. 4, pp. 843-863.
Protopapadaki et al. "Hip, knee, ankle kinematics and kinetics during stair ascent and descent in healthy young individuals," Clinical Biomechanics, 2007, vol. 22, No. 2, pp. 203-210.
Rietdyk "Postural Responses to Unexpected Multi-Directional Upper Body Perturbations," Shirley Rietdyk, 1999, Thesis presented to the University of Waterloo in fulfillment of the thesis requirement for the degree of Doctor of Philosophy in Kinesiology, 126 pages.
Rietdyk et al. "Balance recovery from medio-lateral perturbations of the upper body during standing," Journal of Biomechanics, Nov. 1999, vol. 32, No. 11, pp. 1149-1158.
Roaas et al. "Normal Range of Motion of the Hip, Knee and Ankle Joints in Male Subjects, 30-40 Years of Age," Acta Orthopaedica Scandinavica, 1982, vol. 53, No. 2, pp. 205-208.
Rosati "The prevalence of multiple sclerosis in the world: an update," Neurological Sciences, 2001, vol. 22, pp. 117-139.
Schache et al. "On the expression of joint moments during gait," Gait & Posture, 2007, vol. 25, No. 3, pp. 440-452.
Schenkman et al. "Whole-Body Movements During Rising to Standing from Sitting," Physical Therapy, Oct. 1990, vol. 70, No. 10, pp. 638-648.
Singh et al. "Global prevalence and incidence of traumatic spinal cord injury," Clinical Epidemiology, 2014, vol. 6, pp. 309-331.
Stoquart et al. "Effect of speed on kinematic, kinetic, electromyographic and energetic reference values during treadmill walking," Neurophysiologie Clinique/Clinical Neurophysiology, 2008, vol. 38, No. 2, pp. 105-116.
Tucker et al. "Control strategies for active lower extremity prosthetics and orthotics: a review," Journal of NeuroEngineering and Rehabilitation, 2015, vol. 12, No. 1, Article 1, 30 pages.
Vukobratovic et al. "Development of active anthropomorphic exoskeletons," Medical and Biological Engineering, Jan. 1974, vol. 12, No. 1, pp. 66-80.
Winter "Kinematic and Kinetic Patterns in Human Gait: Variability and Compensating Effects," Human Movement Science, 1984, vol. 3, No. 1-2, pp. 51-76.
Zhang et al. "The Incidence, Prevalence, and Mortality of Stroke in France, Germany, Italy, Spain, the UK, and the US: A Literature Review," Stroke Research and Treatment, 2012, vol. 2012, Article ID 436125, 12 pages.
Official Action for European Patent Application No. 17794074.9, dated May 15, 2020, 8 pages.
U.S. Appl. No. 17/270,587, filed Feb. 23, 2021, Ortlieb et al.

(56) References Cited

OTHER PUBLICATIONS

"German Social Court Ruling Deems ReWalk Exoskeleton Medically Necessary as Medical Aid for Recipient with Spinal Cord Injury," ReWalks Robotics, 2016, 5 pages [retrieved online from: ir.rewalk.com/news-releases/news-release-details/german-social-court-ruling-deems-rewalk-exoskeleton-medically].

Au et al. "Powered Ankle-Foot Prosthesis Improves Walking Metabolic Economy," IEEE Transactions on Robotics, Feb. 2009, vol. 25, No. 1, pp. 51-66.

Au et al. "Powered ankle-foot prosthesis to assist level-ground and stair-descent gaits," Neural Networks, 2008, vol. 21, No. 4, pp. 654-666.

Boehler et al. "Design, Implementation and Test Results of a Robust Control Method for a Powered Ankle Foot Orthosis (AFO)," 2008 IEEE International Conference on Robotics and Automation, 2008, pp. 2025-2030.

Farris et al. "Performance Evaluation of a Lower Limb Exoskeleton for Stair Ascent and Descent with Paraplegia," Conf Proc IEEE Eng Med Biol Soc. 2012, 2012, pp. 1908-1911.

Fite et al. "Design and Control of an Electrically Powered Knee Prosthesis," IEEE 10th International Conference on Rehabilitation Robotics, 2007, pp. 902-905.

Grimes "An Active Multi-Mode Above-Knee Prosthesis Controller," Massachusetts Institute of Technology, Submitted in Partial Fulfillment of the Requirements for the Degree of Doctor of Philosophy, Jun. 1979, 160 pages.

Hoover et al. "Stair Ascent With a Powered Transfemoral Prosthesis Under Direct Myoelectric Control," IEEE/ASME Transactions on Mechatronics, Jun. 2013, vol. 18, No. 3, pp. 1191-1200.

Jimenez-Fabian et al. "Review of control algorithms for robotic ankle systems in lower-limb orthoses, prostheses, and exoskeletons," Medical Engineering & Physics, May 2012, vol. 34, No. 4, pp. 397-408.

Kawamoto et al. "Power Assist Method for HAL-3 Estimating Operator's Intention Based on Motion Information," Proceedings of the 2003 IEEE International Workshop on Robot and Human Interactive Communication, 2003, pp. 67-72.

Lawson et al. "Evaluation of a Coordinated Control System for a Pair of Powered Transfemoral Prostheses," 2013 IEEE International Conference on Robotics and Automation, 2013, pp. 3888-3893.

Li et al. "Gait Mode Recognition and Control for a Portable-Powered Ankle-Foot Orthosis," 2013 IEEE International Conference on Rehabilitation Robotics, 2013, 8 pages.

Liu et al. "Improving Finite State Impedance Control of Active-Transfemoral Prosthesis Using Dempster-Shafer Based State Transition Rules," Journal of Intelligent & Robotic Systems, 2014, vol. 76, No. 3-4, pp. 461-474.

Marchal-Crespo et al. "Review of control strategies for robotic movement training after neurologic injury," Journal of NeuroEngineering and Rehabilitation, 2009, vol. 6, Article 20, 15 pages.

Miller et al. "Clinical effectiveness and safety of powered exoskeleton-assisted walking in patients with spinal cord injury: systematic review with meta-analysis," Medical Devices: Evidence and Research, Mar. 2016, vol. 9, pp. 455-466.

Murray et al. "Towards the Use of a Lower Limb Exoskeleton for Locomotion Assistance in Individuals with Neuromuscular Locomotor Deficits," Conf Proc IEEE Eng Med Biol Soc. 2012, 2012, pp. 1912-1915.

Ortlieb et al. "An Active Impedance Controller to Assist Gait in People with Neuromuscular Diseases: Implementation to the Hip Joint of the AUTONOMYO Exoskeleton," 2018 7th IEEE International Conference on Biomedical Robotics and Biomechatronics (Biorob), Aug. 26-29, 2018, Enschede, Netherlands, pp. 537-543.

Quintero et al. "A Powered Lower Limb Orthosis for Providing Legged Mobility in Paraplegic Individuals," Topics in Spinal Cord Injury Rehabilitation, 2011, vol. 17, No. 1, pp. 25-33.

Riener et al. "Patient-Cooperative Strategies for Robot-Aided Treadmill Training: First Experimental Results," IEEE Transactions on Neural Systems and Rehabilitation Engineering, Sep. 2005, vol. 13, No. 3, pp. 380-394.

Sankai "HAL: Hybrid Assistive Limb Based on Cybernics," in Robotics Research, Springer, Berlin, 2010, pp. 25-34.

Sup et al. "Design and Control of an Active Electrical Knee and Ankle Prosthesis," Proc IEEE RAS EMBS Int Conf Biomed Robot Biomechatron, Oct. 2008, pp. 523-528.

Veneman et al. "Design and Evaluation of the LOPES Exoskeleton Robot for Interactive Gait Rehabilitation," IEEE Transactions on Neural Systems and Rehabilitation Engineering, Sep. 2007, vol. 15, No. 3, pp. 379-386.

Zlatnik et al. "Finite-State Control of a Trans-Femoral (TF) Prosthesis," IEEE Transactions on Control Systems Technology, May 2002, vol. 10, No. 3, pp. 408-420.

International Search Report and Written Opinion for International (PCT) Patent Application No. PCT/IB2019/057150, dated Nov. 22, 2019, 10 pages.

* cited by examiner

MODULAR AND MINIMALLY CONSTRAINING LOWER LIMB EXOSKELETON FOR ENHANCED MOBILITY AND BALANCE AUGMENTATION

CROSS REFERENCE TO RELATED APPLICATION

This application is a national stage application under 35 U.S.C. 371 and claims the benefit of PCT Application No. PCT/JB2017/056112 having an international filing date of Oct. 4, 2017, which designated the Unite States, which PCT application claimed the benefit of European application No. 16192217.4 filed on Oct. 4, 2016 in the name of ECOLE POLYTECHNIQUE FEDERALE DE LAUSANNE (EPFL), the disclosure of each of which are incorporated herein by reference.

TECHNICAL FIELD

Locomotion disorders can severely affect the ambulatory capacity of individuals and result in serious issues for the persons concerned and for the society. Based on a 2012 U.S. Health National Survey [1], 7% of the population sample reported not to be able (or to find "very difficult") to walk one quarter of a mile (~400 m). Serious mobility difficulties thus concern a large part of the population (estimated about 22 million people in the USA). With a median about 64 years old [1], gait disorders largely affect elderly people and are subject to a continuous increase because of the population ageing. Regarding the other half of the affected population which is of working age, the unemployment rate is reported to be over 75% [1] and is a significant burden for the society. Among the different causes of walking impairments, most of them are related to neurological disorders such as:

Stroke (incidence: 11-35/10'000/year [2])
Parkinson disease (PD) (prevalence: 10-20/10'000 [3])
Multiple sclerosis (MS) (prevalence: ~1-15/10'000 [4])
Spinal cord injury (SCI) (prevalence: 2.5-9/10'000 [5])
Neuromuscular diseases (NMD) (prevalence: ~3/10'000 [6])

Besides strokes for which physical rehabilitation allows to recover capabilities, most neurological disorders are currently incurable. PD, MS and NMD patients lose their motor and functional skills slowly while it is abrupt for SCI and stroke patients. Moderate to severe symptoms lead, among other, to a loss of ambulation due to poor balance control and weak muscles and to the loss of autonomy. Wheelchairs are the unique alternative for such patients. However, recent technological advances in wearable robotics have opened the door to a new era of walking aids: medical lower limb exoskeletons.

Lower limb exoskeletons have first been developed for various applications such as strength augmentation, load carrying and vertical mobilization of paraplegics. Vukobratovic et al. had already developed a design of exoskeleton for SCI patients in the 70's [7]. However, the first certified products have been only available on the market since 2010 (ReWalk Robotics: CE marked in 2010 and FDA cleared in 2014, Ekso bionics: FDA cleared in 2012 and CE marked in 2012 and 2016(medical), Cyberdyne HAL: CE marked in 2013(medical) [8]-[10]). While the number of proposed medical devices is in constant expansion, the diversity of targeted populations is confined mostly to people with severe and partial impairments: i.e. SCI patients and victims of stroke.

Accordingly, the present invention concerns the field of exoskeletons for patients, more specifically the lower limb exoskeletons. Of course, the use of the present invention is not limited to disabled or ill patients but may also be used by healthy users.

A lower limb exoskeleton is a mechatronic system adapted to be attached to a person's lower limbs and trunk. It enables mobilization of the legs of the user by the means of actuators and joints. This mobilization enables a person with disabilities to move and perform actions such as standing up, walking, climbing stairs or standing with other individuals. Other applications are of course possible as well, such as rehabilitation therapy, gait correction, support of workers to carry loads, physical training, augmented reality, all these uses are non-limiting examples.

BACKGROUND ART

Exoskeletons and such systems are known per se, for example under the tradenames ReWalk™, EksoGT™, REX bionics and Indego®.

Other examples are given for example by the following publications.

U.S. Pat. No. 7,628,766 B1 discloses a lower extremity enhancer to be worn by a user to enable the user to carry a load includes two leg supports having a plurality of jointed links. Proximal ends of the leg supports are connected to a back frame adapted to carry the load. Distal ends of the leg supports are connected to two foot links. The leg supports are powered by a plurality of actuators adapted to apply torques to the leg supports in response to movement of the user's leg.

FR 2981266 discloses another example of a lower limb exoskeleton.

WO2015/140353 discloses an exoskeleton in which a foot structure includes a supporting plane on which the foot of a person wearing the exoskeleton can rest when the foot is flat. The supporting plane comprises a front platform and a rear platform. A foot pivot link connects the front platform to the rear platform.

SUMMARY OF THE INVENTION

The present invention has the aim of presenting a novel design of a lower limb exoskeleton that preferably but not exclusively, targets people with moderate neurological disorders [11]. This device is intended to be suited to neurological disorders such as PD, MS, NMD or stroke. Original design specifications are expressed in the following specification where the differences and implications of mobilization and assistive strategies are described in detail.

Accordingly, an aim of the present invention is to improve the known systems, devices and methods.

Another aim of the invention is to promote, rehabilitate, enhance or assist the mobility of the person that is wearing the exoskeleton according to the present invention.

The structure according to the invention is primarily, but not limitatively, intended for people or patients with muscle or neurologically related disorders such as multiple sclerosis, muscular dystrophy or atrophy, frail elderly, post-stroke symptoms, etc.

It may also be used to reduce and ease the recovery following an injury or a surgery about the lower limbs, for example in case of hip replacement or muscular tear.

It may also be used as a motion guidance for the joint trajectories to allow people with abnormal gait to recover healthy lower limb motions.

In addition, the invention may be used to assist the carrying of loads in various applications where it enhances the load carrying capacity of the user while lowering the risk of injury such as back pain.

Other disorders, disabilities and applications may also justify the use of the present invention, no limitation being intended by the examples and embodiments given in the present specification, figures and claims.

Constraints for Structures According to Embodiments the Invention

A wearable robotic lower limb assistive device requires several specifications:

A. Assistance vs. Mobilization Strategies

Mobilization refers to a strategy where a device is controlled in position to follow some predefined trajectories; each corresponds to a predefined gait cycle. A mobilization strategy considers only unidirectional physical interactions from the exoskeleton to the user's legs. It typically fits with the use by SCI people who are not capable to, fully or partially, control over their lower limbs. That strategy is suited to work with crutches thanks to which the user is able to balance and orientate the direction of walking. One drawback, however, is the need of non-impaired upper limbs for a good use of crutches.

In opposition, assistance refers to a strategy where the user guides the motion while the device provides additional forces to perform the motion. In this case, bidirectional interactions between the user and the exoskeleton have to be managed. The main advantage of the assistive approach is that it encourages the implication of the user when walking with the exoskeleton. This latter could aid the patient perform a task while offering rehabilitation benefits. If assistance allows the user to fully manage in real time the motion she/he is performing, the controller is however sensitive to the variability in the users' level of impairment. Considerable work still need to be done in that sense.

Considering the mechanical specifications, a strategy of assistance requires a high transparency (low impedance of the mechanism) which implies:

1. Good backdrivability
2. Low inertia perception

These specifications concern mainly the actuators and transmission mechanisms of the exoskeleton.

B. Kinematics and Dynamics

Regarding the panel of activities aimed to be performed, i.e. level walking, stairs climbing/descending and sit-to-stand transition; kinematic and dynamic specifications can be defined from the literature. The range of motion for each joint should respect the overall maximal and minimal values recorded by one of the activities. The higher flexion angles for the hip and the knee are obtained during the sit-to-stand transition, where angles' peaks reach 104° and 106° respectively for the hip and the knee flexion [12], [13]. Maximal extension angles for the hip are obtained during fast walking at toe off with peak about −20° of flexion [14], [15].

Knee extension maximal angle is physiological and is reported about −1° to −10° of flexion [16]. Hip adduction/abduction angle ranges about ±5° [17].

In terms of dynamics, two criteria need to be met: the higher gait cycle rate and a defined percentage of assistance.

These constraints determine specifications of peak velocity, cyclic acceleration cost, nominal torque and peak torque. As presented [18], the limit of walking capacity in NMD patients is situated about a need of 50% of assistance to recover a healthy walking ability. Table I presents quantitative values regarding walking extracted from measurements of Ounpuu 1994 in healthy gait kinematics and kinetics at speed of 1.17 m/s (4.2 km/h) and mean cycle duration of 0.9 s [17], data for the hip adduction/abduction are taken from Schache and Baker 2006 [19]. Table II and III respectively illustrates values for the sit-to-stand transition and the ascension of stairs based on the studies from Mak et al. 2003 and Protopapadaki et al. 2007. Note that loads are normalized over bodyweight and also height when rising from a chair as large angles (about) 90° are involved. The requirements of the load capacity of the actuators not only depend on the level of force provided to the user (the assistance), but also on the force consumed to perform the motion of the device. As reported in [20], dynamics of walking can require a full motor capacity without load.

TABLE I

DYNAMIC SPECIFICATIONS FOR LEVEL WALKING BASED ON [17] AND [19]

| | Specifications in Level Walking | | |
|---|---|---|---|
| Joints | Peak Velocity [°/s] | 50% of RMS Torque [Nm/kg]$^d$ | 50% of Peak Torque [Nm/kg]$^d$ |
| Hip A-A$^a$ | 55.7 | 0.18 (9/18 Nm)$^e$ | 0.33 (16.5/33 Nm)$^e$ |
| Hip F-E$^b$ | 178.5 | 0.15 (7.5/15 Nm)$^e$ | 0.36 (18/36 Nm)$^e$ |
| Knee F-E$^b$ | 360 | 0.09 (4.5/9 Nm)$^e$ | 0.25 (12.5/25 Nm)$^e$ |
| Ankle DF-PF$^c$ | 201.6 | 0.25 (12/25 Nm)$^e$ | 0.61 (30.5/61 Nm)$^e$ |

$^a$A-A: adduction/abduction,
$^b$F-E: flexion/extension,
$^c$DF-PF: dorsiflexion/plantar flexion
$^d$Torques are normalized over bodyweight,
$^e$Torque values for a bodyweight of 50 kg/100 kg respectively

TABLE II

DYNAMIC SPECIFICATIONS FOR RISING FROM A CHAIR BASED ON [13]

| | Specifications in Sit-to-Stand (STS) Transition | | |
|---|---|---|---|
| Joints | STS duration [s] | 50% of Peak Torque per Leg [Nm/kg/m]$^d$ | Total Peak Torque per Leg [Nm/kg/m]$^d$ |
| Hip A-A$^a$ | 1.4 in healthy | — | — |
| Hip F-E$^b$ | persons (2.3 in | 0.23 (18/43 Nm)$^e$ | 0.45 (35/87 Nm)$^e$ |
| Knee F-E$^b$ | persons with | 0.29 (23/56 Nm)$^e$ | 0.58 (45/111 Nm)$^e$ |
| Ankle DF-PF$^c$ | Parkinson) | 0.16 (12/30 Nm)$^e$ | 0.32 (25/61 Nm)$^e$ |

$^a$A-A: adduction/abduction,
$^b$F-E: flexion/extension,
$^c$DF-PF: dorsiflexion/plantar flexion
$^d$Torques are normalized over bodyweight and body height and assumed symmetrical in both legs,
$^e$Torque values for a bodyweight and height of 50 kg and 1 m 55/100 kg and 1 m 90 respectively

TABLE III

DYNAMIC SPECIFICATIONS FOR ASCENDING STAIRS BASED ON [21]

| | Specifications in Ascending Stairs | | |
|---|---|---|---|
| Joints | Cycle duration [s] | 50% of RMS Torque [Nm/kg]$^d$ | 50% of Peak Torque [Nm/kg]$^d$ |
| Hip A-A$^a$ | 1.45 | — | — |
| Hip F-E$^b$ | | 0.17 (8.5/17 Nm)$^e$ | 0.38 (19/38 Nm)$^e$ |
| Knee F-E$^b$ | | 0.14 (7/14 Nm)$^e$ | 0.29 (15/29 Nm)$^e$ |

TABLE III-continued

DYNAMIC SPECIFICATIONS FOR ASCENDING
STAIRS BASED ON [21]

| | | Specifications in Ascending Stairs | |
|---|---|---|---|
| Joints | Cycle duration [s] | 50% of RMS Torque [Nm/kg]$^d$ | 50% of Peak Torque [Nm/kg]$^d$ |
| Ankle DF-PF$^c$ | | 0.38 (19/38 Nm)$^e$ | 0.72 (36/72 Nm)$^e$ |

$^a$A-A: adduction/abduction,
$^b$F-E: flexion/extension,
$^c$DF-PF: dorsiflexion/plantar flexion
$^d$Torques are normalized over bodyweight,
$^e$Torque values for a bodyweight of 50 kg/100 kg respectively C. Ergonomy Neurological disorders have the specificity of not being restricted to the lower limbs of the body but to a large part of it, except for SCI patients with lowest lesions. Hence, the use of external support such as crutches is not adapted for such people and balance should be carried out by other means.

Ergonomic aspects such as ease of don and doff, autonomy of several hours, weight and compactness of the device for transportation and handling are to be considered. Another aspect that is not treated in this paper is the sound level of the actuation that has to be as low as possible. Eventually, safety is also a key aspect to be considered in the design of an exoskeleton as presented in [22].

Actuation Units

1. High Dynamics

High dynamics are required in walking activities to increase the cadence and allow the reach of normal to fast walking speed. High dynamics are also very important in case of tripping or loss of balance to recover stability and prevent the user from falling. Peak acceleration of the foot in the forward direction is about 3.8 g in average during walking, see reference [27].

To allow high dynamics, the inertia of the system has to be optimized. A small reduction ratio between a motor and an end effector provides higher dynamics, but a tradeoff has to be found to transmit enough torque to the end effector. The motor and the reductor mechanism technologies can largely influence the dynamics of the system. Most importantly, the position of the actuator plays a key role because of its mass. Placed on distal joints such as the knee or the ankle, actuators largely increase the segment mass and reduce the dynamics of the device. Accordingly, this construction may be improved for example by application of the principles described herein.

2. High Joint Torques

For an appropriate assistance, between 50% to 100% of the joint torque capacity of a healthy subject are required. Joint torques are a factor of the motor nominal torque capacity, the reduction ratio and the load capacity of the different structures. The tradeoff has to be selected between the mentioned factors and the different elements' (motor, reductor and segment) mass, inertia and bulkiness (or volume).

3. Backdrivability

The backdrivability of the system is the capacity of a motor unit to be reversely driven from the output, which means for example from the user. This property is very important regarding the interaction of the user with the device. Without it, the motions would be fully performed by the device without any positive contribution of the user which is essential regarding the aspects of interaction and rehabilitation. A high level of reduction decreases the capacity of backdrivability.

4. Efficiency

The efficiency of the actuation units (actuator and mechanical transmission) is a secondary aspect that allows to reduce the power consumption and increase the autonomy of the system. The efficiency is closely linked to the backdrivability as both of them are mostly reduced by mechanical losses such as friction. The efficiency of the actuation units is inversely proportional with the reduction ratio.

5. Audible Noise

Audible noise is mostly produced by the actuation units. It can provide positive feedback on the state of the device to the user, but will also reduce the comfort of the user when it reaches or exceeds a certain level.

Architecture

6. Freedom of Motion

A high degree of freedom of motion is required for the performance of any activity in a natural manner. One leg uses about 8 degrees of freedom (DoFs) (3 at the hip, 1 at the knee, 3 at the ankle and 1 at the foot). A fully actuated system would then be very bulky and complex to control. A tradeoff between compactness and actuated DoFs is required.

7. Balance Control without External Support

The minimum number of actuated DoFs to perform a full balance control in every direction should be of 6 to be able to control the three forces and the three momentum applied on the center of mass of the whole system. In case of the use of an external support such as crutches or a rollator, the number of actuated DoFs can be reduced, but external supports are largely constraining the arms and are demanding for the upper body.

8. Modularity

The invention targets the assistance of disorders that are quite different and that can take various forms even for the same disorder. For example, a muscular weakness can largely vary from one joint to the other. A modularity of the actuation unit is required to be able to adapt the power of each joint to several users with different needs. A modular actuation unit includes a selection of the power of the motor or of the reduction ratio to adapt the level of assistance that can be provided. The modularity includes also the possibility to remove completely one actuation unit. This allows to adjust and optimize the weight of the system and the resistance to the motion.

Wearability

9. Easy Don and Doff

It is important that the user can don and doff the device rapidly and without assistance. As users could not be able to stand up by themselves, the device has to be preferably don in a sitting position.

10. Low Bulkiness

In order for the user to feel comfortable physically and socially, it is important that the device is compact and quiet. It is also important that the device does not constrain much the user environment. For example, it should be compact enough not to require adapted chairs or large doors.

Activities

The invention should be compatible with the main activities related to the bipedal activities. These activities are primarily the sit-to-stand transition, the level walking, steps and stairs ascent and descent. Each activity requires specific joints range of motions and joint torques that should be taken into account.

Although the above description has related specifically to lower limb device, the majority of the principles and features as described herein are also applicable to upper limb device as well, in a corresponding and adapted manner for the intended use.

In an embodiment, the invention concerns a modular, backdrivable, highly dynamic and compact exoskeleton structure fastened to the body of a user, wherein said exoskeleton structure comprises at least one set of a plurality of joints, wherein the exoskeleton structure comprises a set of different removable, adaptable and backdrivable actuation units dedicated to each joints of the structure and remotely located on the structure to decrease inertia and mass on the distal segments of the structure, wherein each joint can be modularily let free, or constrained by a visco-elastic mechanism or actuated by a corresponding actuation unit.

In an embodiment, the structure is a lower limb exoskeleton which is fastened to the wearer at the trunk level with a brace and at the foot level.

In an embodiment, the brace may be an orthopaedic brace.

In an embodiment, the structure comprises at least one set of three joints corresponding to the hip abduction/adduction, the hip flexion/extension and the knee flexion/extension of the wearer of the structure.

In an embodiment, the actuation units of the structure may be located around the trunk of the wearer.

In an embodiment, the structure comprises two sets of three joints.

In an embodiment, the joints are actuated by a cable system passing through the exoskeleton's joints.

In an embodiment, the structure is extended to one, two or three of the ankle degrees of freedom, where the joint(s) is(are) constrained by a visco-elastic mechanism.

In an embodiment of the structure, a rotation around the z-axis is let free to authorize a free internal/external rotation of the hip or of the ankle of the wearer.

In an embodiment, a body shaped soft interface between the exoskeleton and the wearer is placed under the knee of the wearer and/or along the thigh of the wearer.

In an embodiment, the actuation means of the structure may be activated or not.

In an embodiment, the invention concerns a method of using a structure as defined in the present application.

Based on the embodiments described herein, the present invention brings the following features and advantages:
- motors remotely placed from the joints and cable transmission
- the above allows reversibility and high dynamics (inertial gain of about 30% and reduced friction thanks to the transmission)
- use of the system as a haptic device which gives access to non-constraining control strategies based on force control with a high capacity of interaction between the user and the exoskeleton—the user is master of his movements and does not only follow the movements of the exoskeleton.
- allows to be used by users with severe lesions (paraplegia) as users with reduced muscular weakness;
- allows to adjust the level of assistance (through software) and to adapt the assistance for each articulation as well as adapt the assistance to the evolution (positive in case of reeducation/negative in case of degenerative disease) muscular and/or motor difficulties of the user;
- Gain of bulk (thin segments along the legs) as an advantage;
- freedom of movement—up to 8 motorized joints (hip adduction, hip flexion, knee flexion, ankle flexion)+6 passive joints (pronation ankle, ankle support, internal rotation hip in standing position);
- the exoskeleton offers total freedom of movement of the lower limbs (14 DoF) while standing and slightly reduced when the hip is flexed;
- the near total freedom of movement makes the system potentially autonomous of external balance support elements as walkers or crutches;
- management of the hip adduction which allows a more natural walking and allows the practice of mass transfer from one foot to the other during walking and thus to improve the balance;
- adjustment and therefore adaptability to different people or patients, for example adjustment in length of the segments along the tibia and femur—adjustment of the hip width;
- modularity of articular architecture;
- each motorized articulation can be made passive—blocked or constrained by (for example) a visco-elastic element—or made free;
- this modularity makes it possible to realize a solution adapted to the specific needs of the user and to lighten the weight of the device.

BRIEF DESCRIPTION OF THE DRAWINGS

The present invention will be better understood from the following description and drawings which show

DETAILED DESCRIPTION

A. Global Architecture

The exoskeleton according to embodiments presented in the present application, comprises, for example, three actuated degrees of freedom (DOFs) per leg, corresponding to the human hip adduction/abduction, hip flexion/extension and knee flexion/extension joints. Three passive DOFs per leg are located about the ankle and reproduce a ball joint with a variable stiffness and viscosity on each axis. The exoskeleton is fastened to the wearer through a maximum of three physical interfaces per leg at the foot, shank and thigh, plus one interface at the trunk level (see FIGS. 1A to 1C and 2A to 2C). The adequate position and number of physical interfaces are not discussed in this paper and will be subject to further investigations.

The electronics includes three motor boards (drives) specifically designed at the laboratory of Robotic Systems (EPFL, Lausanne) for the low level control of the six actuators and a Beagle Bone Black (BeagleBoard.org®) CPU board manages the high level controller (more detail can be found in [23]). The device is empowered by a source of 16 Ah Lithium polymer batteries at 48V for a total weight of 3.8 kg. The total weight of the exoskeleton is about 22.5 kg, including the batteries. About ⅔ of this weight (15 kg) is located in the upper part of the exoskeleton, between the hip and the chest of the user.

B. Hip Add/Abduction Actuation

The actuation of the hip adduction/abduction is part of the originality of embodiments of the present invention. The angular range of motion during walking is small, about 10° but the torques required are similar to the one of the hip flexion/extension during walking.

Despite a small range of motion, the hip adduction/abduction interests consist in its partial implication in the lateral balance control [24], plus the high correlation between its strength and gait velocity [25] in the human body.

Figure 3A:
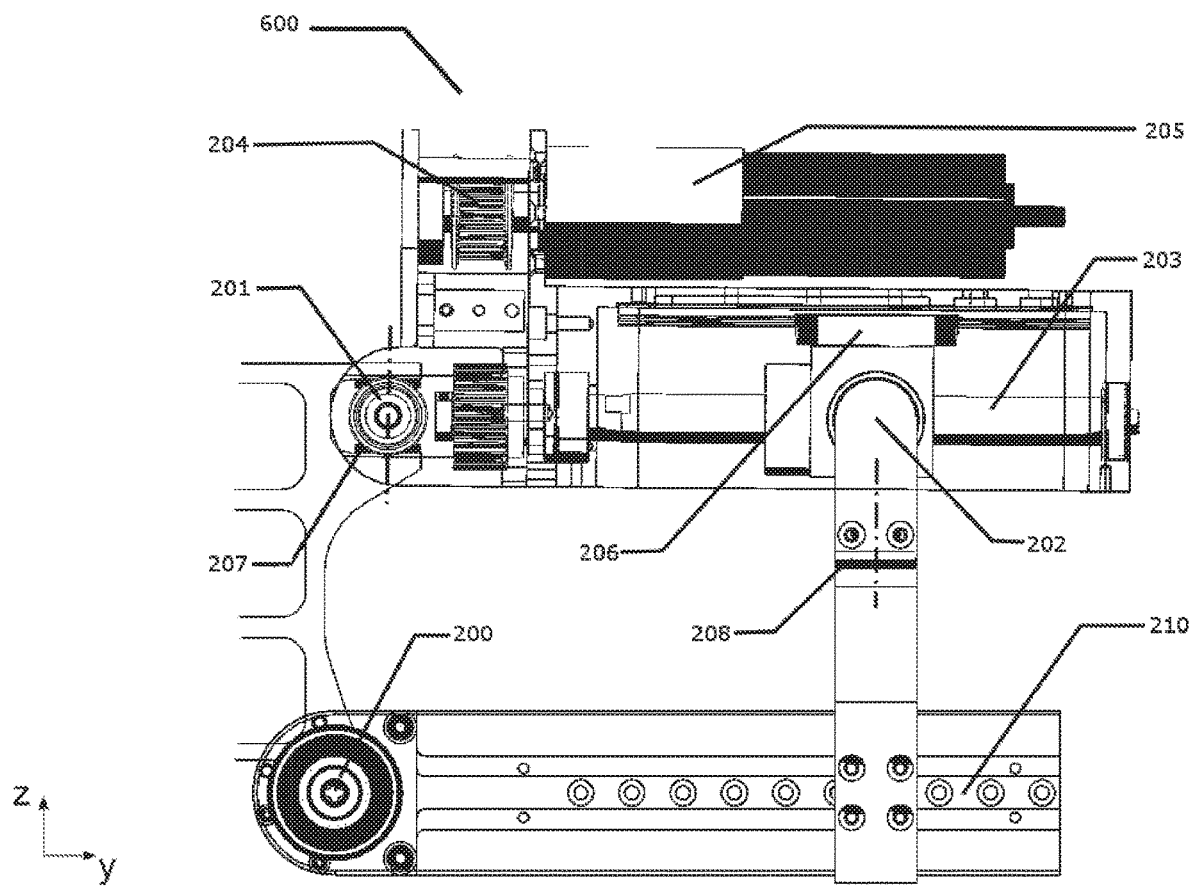
FIGS. 3A and 3B illustrate an actuation unit about a joint according to an embodiment of the invention.
Figure 3B:
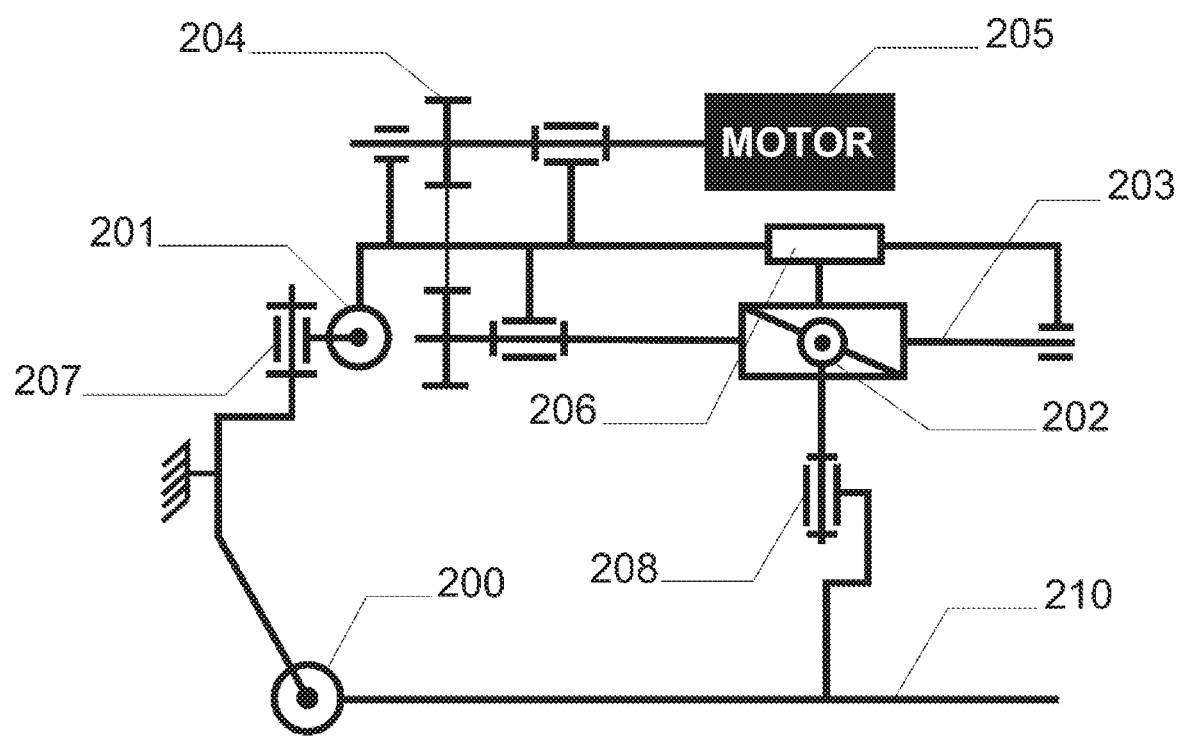

The hip adduction; abduction mechanism is based on a planar four-bar linkage made of three rotations and one translation as illustrated on FIGS. 3A and 3B. The torque from the motor and gear unit is transmitted through a belt and pulleys system to a ballscrew that actuates the four-bar linkage. Eventually, it results in the rotation of the hip adduction/abduction joint.

A brushless DC motor (EC-4pole 30, Maxon Motor AG, Switzerland) may be selected for its high power density and small inertia. It is combined with a planetary gear (GP32 HP, Maxon Motor AG, Switzerland) of transmission ratio i=14:1 which allows to reduce the perceived inertia of the ballscrew at the motor of a factor $i^2$+196. The mounted ballscrew (FA compact series, NSK Ltd, Japan) has a pitch of 5 mm for a stroke of 50 mm. The nut is fastened to a linear guide (prismatic joint on FIGS. 3A and 3B) to avoid radial loading of the ballscrew. An encoder with 1024 pulses per turn measures the motor position, while a linear potentiometer positioned around the final joint provides the absolute hip position. The range of motion for the hip joint is ±15° in adduction and +25° in abduction. The total transmission ratio from the motor to the hip is quasi linear within the range of motion (maximal deviation of 4.5%) and equals to i=1'592:1. Hence, the nominal torque at the hip level, without any energy losses at the motor and transmission level would be of 148 Nm with the currently mounted motor (motor nominal torque: 92.9 mNm).

With a nominal motor speed of 16'600 rpm at a voltage of 48V, velocities of up to 65°/s are reached at the joint, which is within the specifications stated in Table I. The aspects of transparency (backdrivability of the mechanism), dynamics and fulfilment of specifications for given tasks are evaluated in the following description.

C. Hip and Knee Flex/Extension Actuation

The actuation units of the hip and knee flexion/extension are similarly designed. Each unit comprises for example one brushless motor (EC-i 40, Maxon Motor AG, Switzerland) and a corresponding gearbox (GP42 HP, Maxon Motor AG, Switzerland) with a 66:1 transmission ratio. The actuation units are remotely located about the trunk of the user and the power is transmitted to the joints using a cable-pulleys mechanism as illustrated on FIGS. 4A to 4C. A mechanical reduction of 3:1 is additionally provided at this stage thanks to the ratio of diameters between pulleys. A very flexible stainless steel wirerope of diameter 1.76 mm, with minimum breaking load of 2100 N (Carlstahl Technocables, Germany) is used as an example. As presented on FIGS. 4A to 4C, the hip and knee flexion/extension are driven over two stages:

i) from the motors to the hip joint and
ii) from the hip joint to the knee joint.

This design introduces a kinematic coupling between the hip and the knee joint where a positive ratio of 1:1 between both flexions has been determined as optimized in regard of the kinematics and control of the three activities of level walking, sit-to-stand transition and stairs climbing. Hence, a hip flexion motion, driven by motor 241 (FIG. 4C), results in an equal and simultaneous knee flexion motion, whereas motor 321 drives only the knee flexion. The forward and inverse kinematics models are given in equations (1) and (2) respectively.

$$\begin{pmatrix} \dot{\theta}_{HIP} \\ \dot{\theta}_{KNEE} \end{pmatrix} = J \cdot \begin{pmatrix} \dot{q}_B \\ \dot{q}_A \end{pmatrix} \cdot \frac{1}{i}, \text{ with } J = \begin{pmatrix} 1 & 0 \\ 1 & 1 \end{pmatrix} \quad (1)$$

$$\begin{pmatrix} \Gamma_{HIP} \\ \Gamma_{KNEE} \end{pmatrix} = J^{-1} \cdot \begin{pmatrix} \Gamma_B \\ \Gamma_A \end{pmatrix} \cdot i, \text{ with } J^{-1} = \begin{pmatrix} 1 & 0 \\ -1 & 1 \end{pmatrix} \quad (2)$$

With θ-dot the joints velocities, q-dot the motors velocities, Γ the torques at the motors and joints and i the transmission ratio.

The range of motion by design for an embodiment is −30° to 120° for the hip flexion and −10° to 100° for the knee flexion. The total transmission ratio between motors and joints is i=198:1 which allows to reach a nominal torque of ±40 Nm for the hip flexion and ±40 Nm-$\Gamma_{HIP}$ for the knee flexion. Peak torques are limited by the minimal breaking load of the cables that theoretically correspond to an amplitude of 84 Nm per joint. Considering the preloading of the cables, the peak torques are estimated about 60 Nm. The selected motors are limited to a velocity of 8000 rpm, which corresponds to a maximal velocity of ±242°/s at the hip and ±242°/s+$V_{HIP}$ at the knee. Eventually the effect of coupling between the hip and knee joints affects the forces transmitted to the ground or to the user.

An embodiment of the invention described herein firstly is a wearable lower limb device for a single user. It comprises a non-motorized structure presented first with reference to FIGS. 1A to 1C, to which versatile actuation blocs can be added depending on the need of the user which provides modularity to the system/structure according to the invention.

The structure comprises an upper physical interface 100, such as a brace, with adjustable attachment means 101 (for example Velcro® bands or equivalent means, such as belts). This interface 100 links the upper part 110 of the device with one of the user's body segment above the legs (preferably around the trunk for example). Depending on the need of the user, the physical interface 100 may also have additional orthopaedic functions such as supporting the back position and others. The interface 100 can be made of flexible plastic to reach a trade-off between an adaptable fit to the user and a medium rigidity. It can furthermore be furnished with soft tissue like foam to improve the contact with the skin.

The interface 100 comprises a rigid part that is fastened to assembly element 110. This rigid part may be made of carbon fiber that can be molded on the flexible part of the interface 100. Assembly element 110 is an assembly that can be adjusted in height along the z-axis and in inclination about the y-axis. Assembly element 110 links the upper physical interface 100 with both legs of the device. Each leg starts with a first pivot joint 200 along the x-axis. It can be assimilated to the hip abduction/adduction of the user. This pivot 200 may be realized with steel angular contact bearings mounted in O with a medium diameter about 100 mm to ensure a high rigidity. First segment 210 that links the first pivot joint 200 with first hip segment 220, can be adjusted in width (along the y-axis) using a sliding and locking system for example. First hip segment 220 may be adjusted from first segment 210 in inclination around the y-axis, while the length of the hip segment 220 may also be adjusted to conform to the body of the wearer. Segments need to be rigid while the weight of the device should be kept low. Aluminium alloys and carbon fibres may preferably be used as material for the different segments.

First pivot element 300 is a pivot around the y-axis that can be assimilated to the hip flexion/extension motion (sensibly aligned with the user's hip joint). Steel crossed roller bearing with an average diameter of 70 mm may be used as element 300 because of their high rigidity in every directions and their axial compactness (about 8 mm). First leg segment 310 may be adjusted in length. It links first pivot element 300 with second pivot element 400 and a physical interface with the thigh may be fastened to it. This interface may be made as a brace in a soft tissue that can be rapidly and easily strapped around the thigh. Second pivot element 400 is a pivot joint along the y-axis and can be assimilated to the knee flexion/extension motion (sensibly aligned with the user's knee joint). Element 400 may be realized using the same technology as for element 300. Second leg segment 410 that links second pivot element 400 with foot element 500 may be adaptable in length and also rigid. Assembly 410 may be made of two sliding elements such as tubes made of aluminium or carbon fibers that can be fastened using a collar-tightening system (typically found to adjust bicycle saddle's height for example). It may also include a physical interface with the lower leg. This interface could be semi-rigid and could be made of soft tissue in contact with the body. It could be placed a little under the knee, along the tibia, for example.

Foot element 500 is a physical interface with the foot or the shoe of the user. Connection between second leg assembly 410 and foot element 500 is preferably made flexible to allow several degrees of freedom of the foot such as the ankle plantar-/dorsi-flexion, the internal/external rotation of the leg and the ankle eversion/inversion. For example, the connection between assembly 410 and interface element 500 may be realized with a ball-joint made of a rigid part to which two gummy elements are compressed together using a screw of metric size M8. This joint could be located close to the ankle natural joint with small translation along the y-axis for example. Element 500 would preferably be made flexible to allow a natural rolling of the foot during walking.

First pivot joint 200, first pivot element 300 and 400 may include absolute angular sensors such as potentiometers to allow a simple initialization of the device and a redundancy in the position sensing. Multiple sensors such as inertial measurement units and force sensors may be integrated within the physical interface elements 100 and/or 500, or at the connection point between the interfaces and the rest of the structure. These sensors may be used to detect the intention of the user, measure the reaction forces with the ground, measure the orientation of the device and the slope of the ground, etc. for example. Such sensors allow to control in closed loop the strength support provided by the device to the user.

Figure 1A:
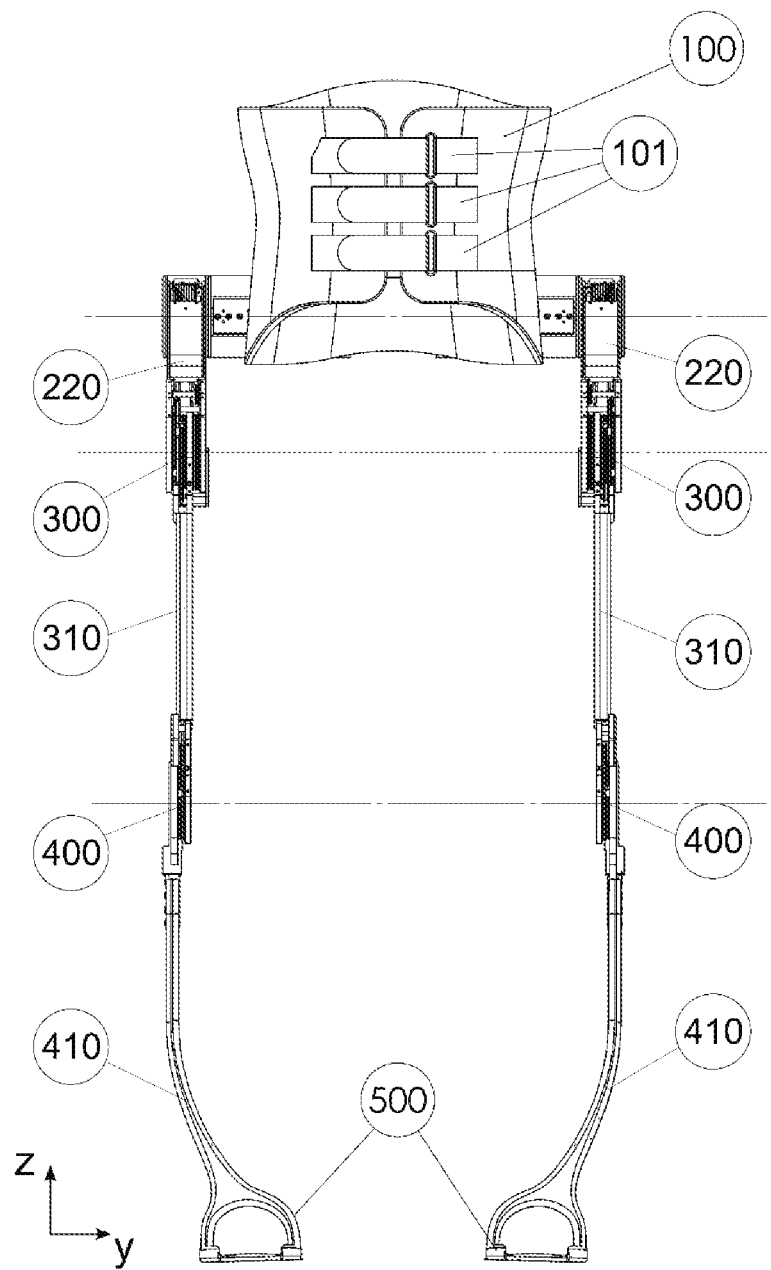
FIGS. 1A to 1C illustrates a device according to an embodiment of the invention without motorization in front, side and back views.
Figure 1B:
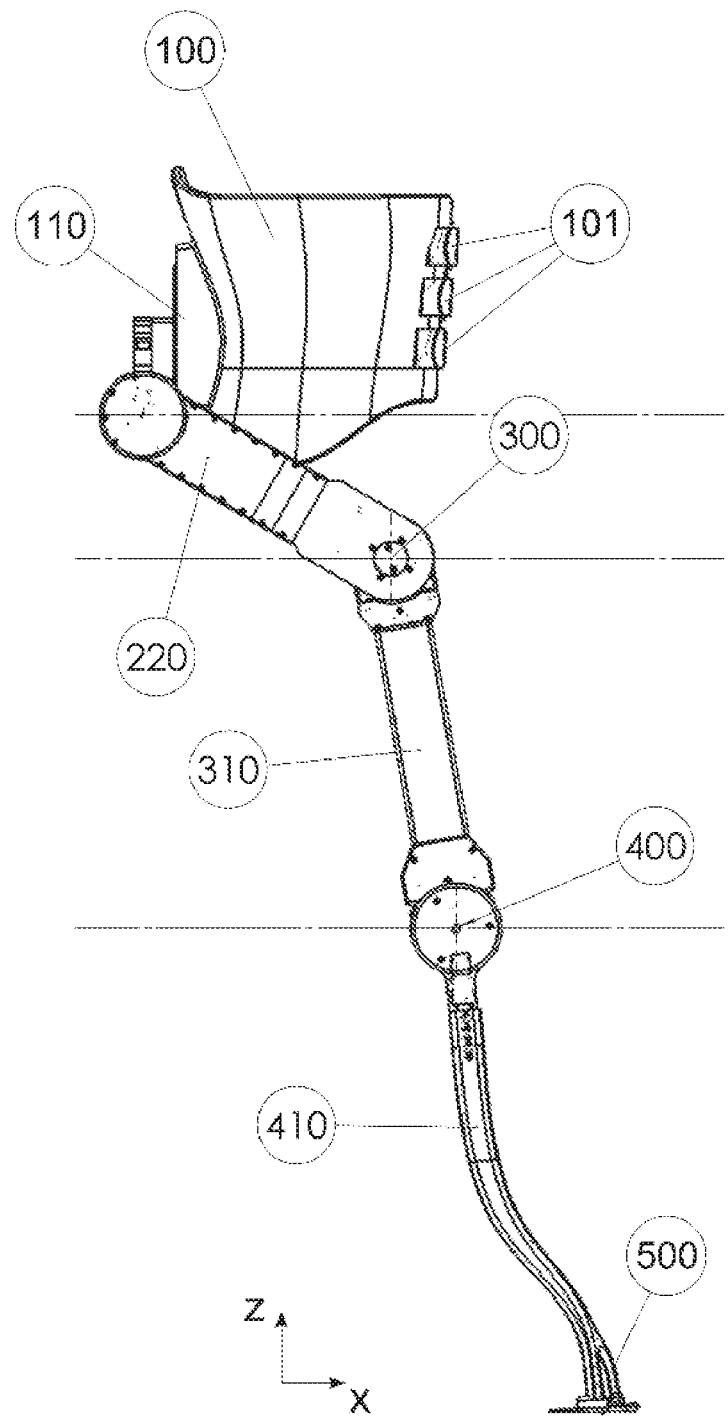
Figure 1C:
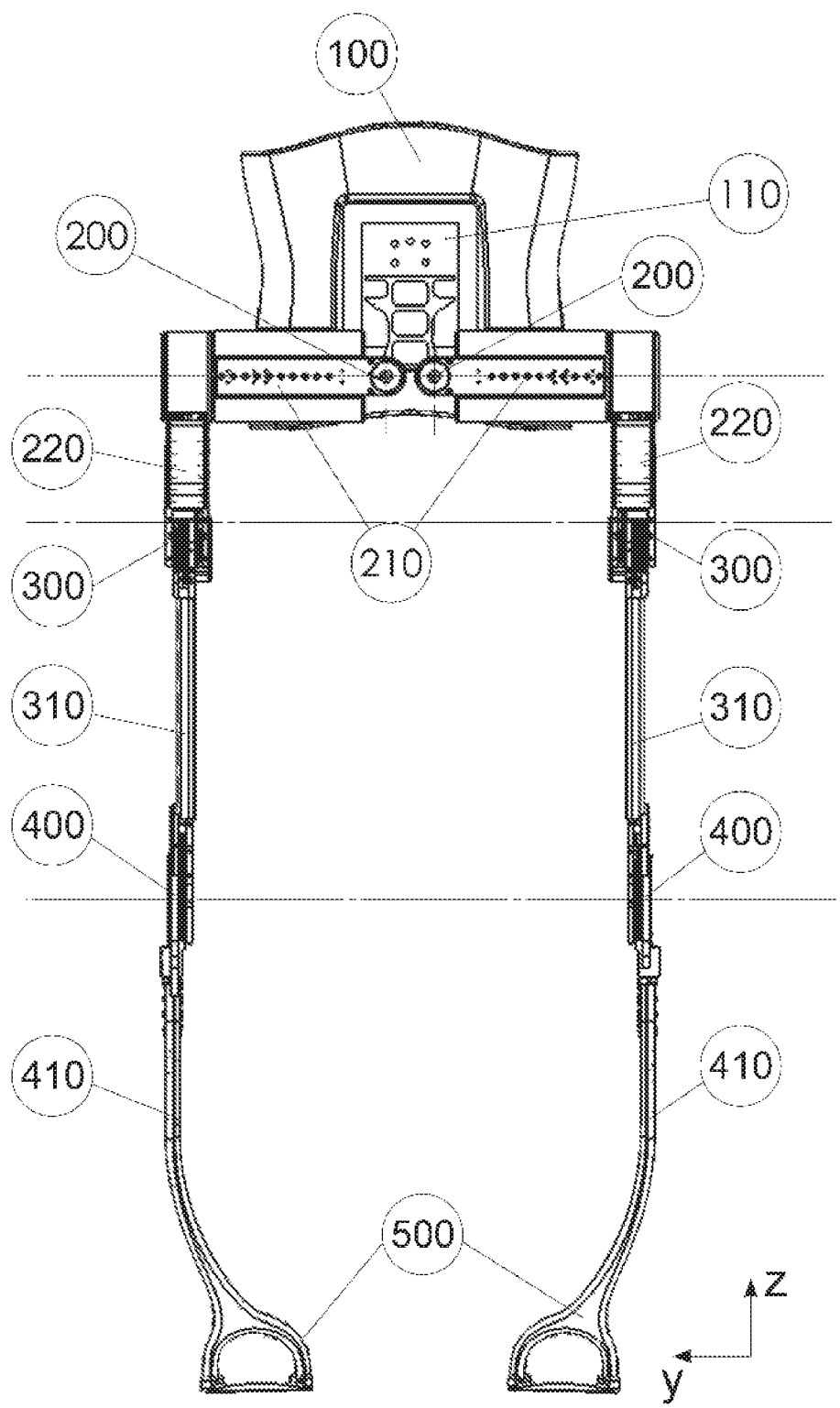
Figure 2A:
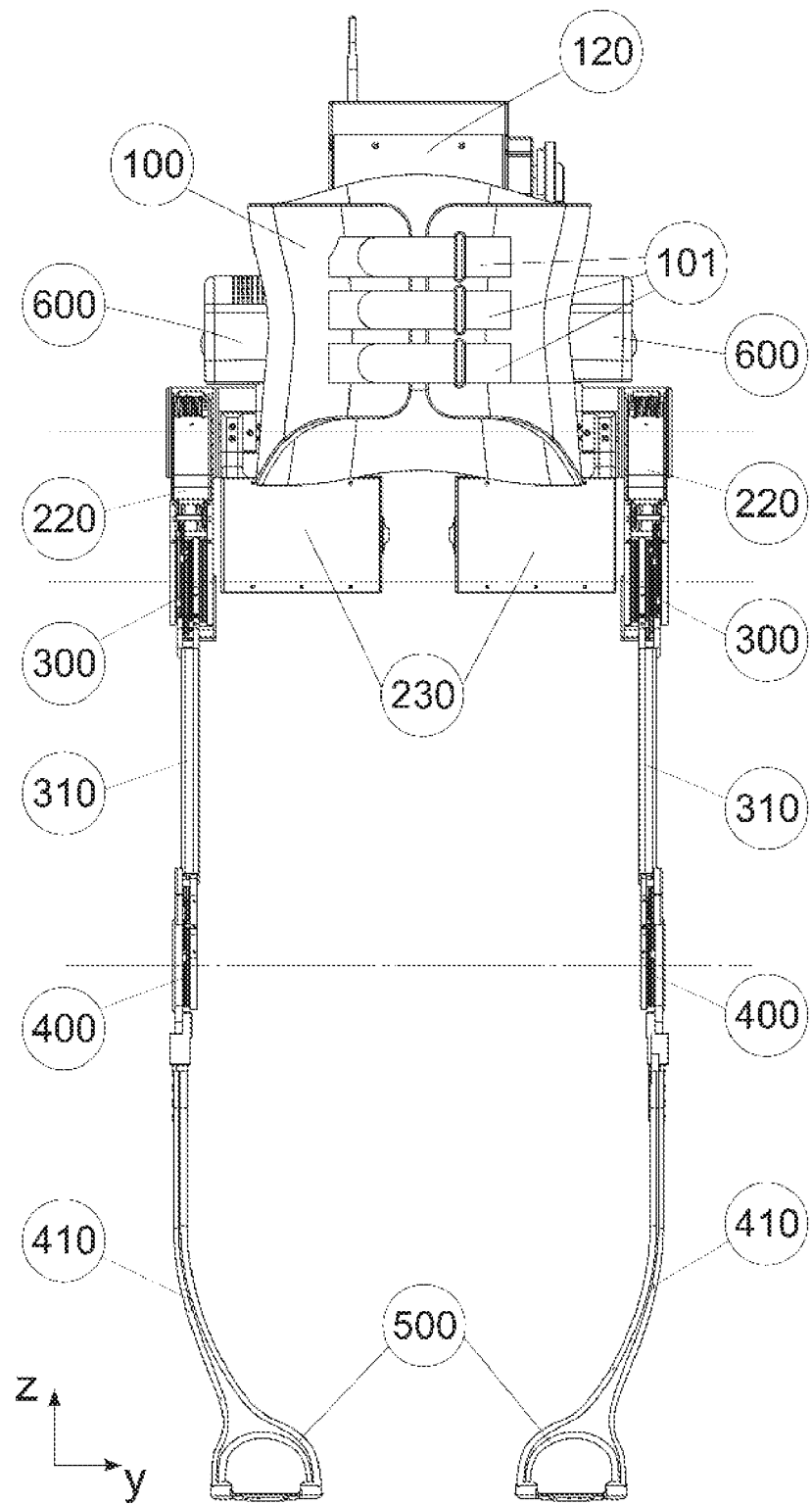
FIGS. 2A to 2C illustrates an embodiment of the invention with actuation, power and electronic units in front, side and back views.
Figure 2B:
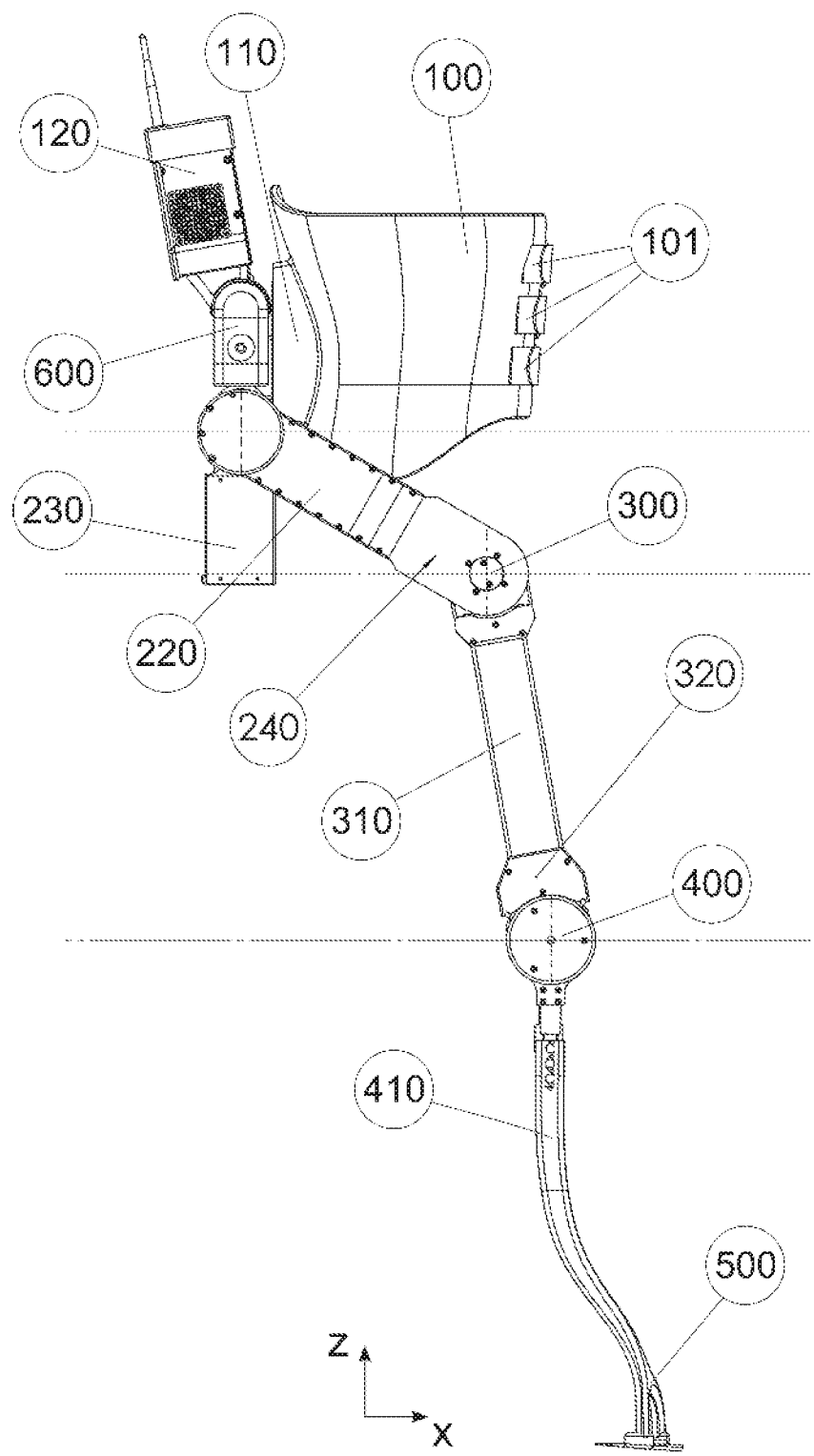
Figure 2C:
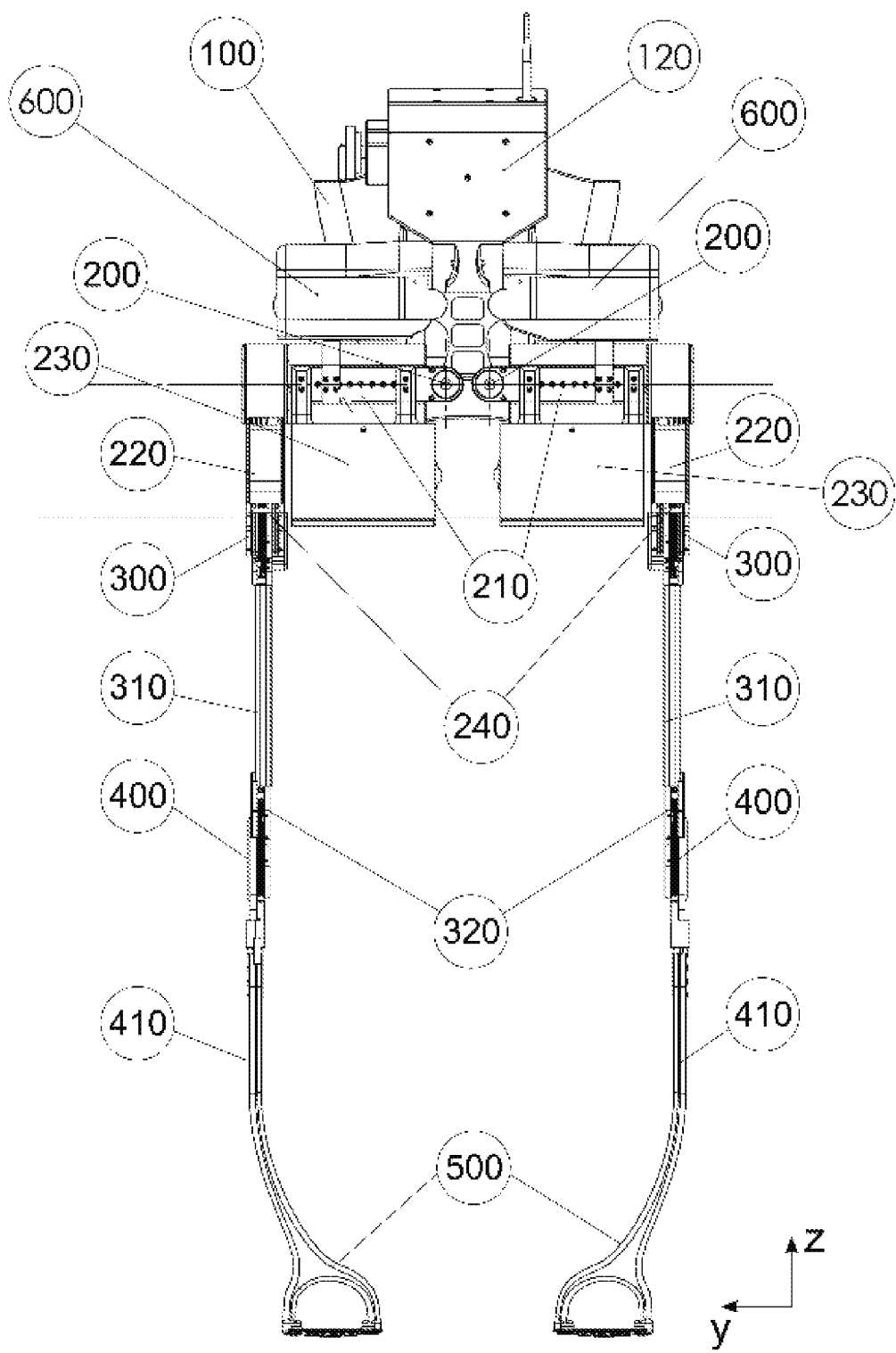

FIGS. 2A to 2C illustrate an embodiment of the invention based on the one illustrated in FIGS. 1A to 1C and with supplementary components/elements such as actuation means and corresponding elements. Box element 120 is a box protecting the electronics of the device: for example a motherboard equipped with a wireless communication system and several motor boards to drive the motors. The box 120 is also preferably equipped with a central power stop and an emergency stop that could be easily reached by the user in case of need. Pack element 230 shows battery packs to power the device as source of electrical energy. Of course, other equivalent sources of energy (i.e. electrical energy) are possible. Pack elements 230 may be fastened to any element 110, 210 or 220 with a preference for assembly element 110 as it is closer to the center of mass (CoM) of the user. A low position of pack elements 230 which represents an important weight of the device improves the stability by lowering the center of gravity. The battery technology preferred is Lithium-ion polymer for its high capacity, low weight and low cost. Other equivalent means are of course possible. Elements 120 and 230 can be made of a mixed of plastic and aluminium alloy materials as no specific rigidity is required.

Unit element 600 is the actuation unit for joint corresponding to first pivot joint 200 that can be assimilated to the hip abduction/adduction. This actuation unit is presented in FIGS. 3A to 3B. Its structure is preferably made out of aluminium alloy for a high rigidity and a low weight. Its kinematics is similar to a 4 bars linkage in the y-z plane with 3 pivot joints 200, 201 and 202 and one helical joint 203. A motor unit 205 actuates the helical joint 203. The motor 205 may directly drive the screw of the joint 203 or may be deported using a belt and pulleys solution 204. The helical joint 203 preferably uses a ball-screw technology for a high backdrivability while preloaded balls allow to reduce the play and the noise during motion. A linear guide 206 is added to avoid an axial loading of the screw, it may be realized using a circulating-ball carriage for high accuracy and lower friction. Additional pivot elements 207 and 208 are pivot along the z-axis that allows to avoid unwanted stress (overconstrained system) on the screw element of the joint 203 that are due to structural deformation under stress or manufacturing inaccuracies. Pivot elements 207 and 208 can be made of plastic plain bearings with damping properties to reduce the noise created by the oscillations of the screw. Pivot elements 207 and 208 axes are respectively crossing joint 201 and 202 axes. Unit element 600 design can allow a range of motion about 60° about first pivot joint 200.

Alternatively, unit element 600 can be equally replaced by a locking system such as a screw fastening assembly to fasten element 110 and first segment 210 together to obtain a rigid joint. Alternatively, unit element 600 may be replaced by a visco-elastic system, such as a closed pneumatic cylinder or a cylinder containing spring washers.

Figure 4A:
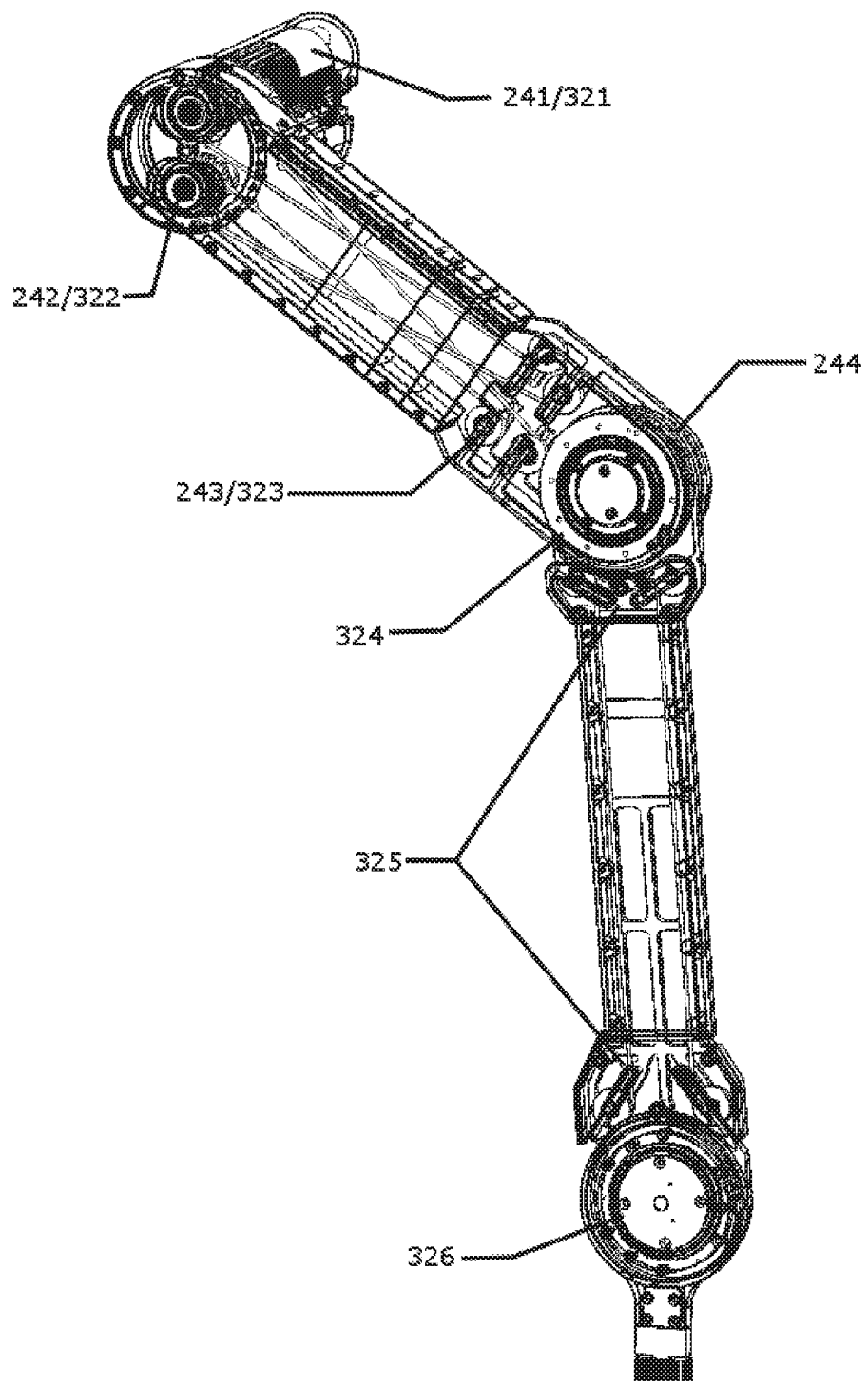
FIGS. 4A to 4C illustrate remote actuation units and joints according to an embodiment of the invention.
Figure 4B:
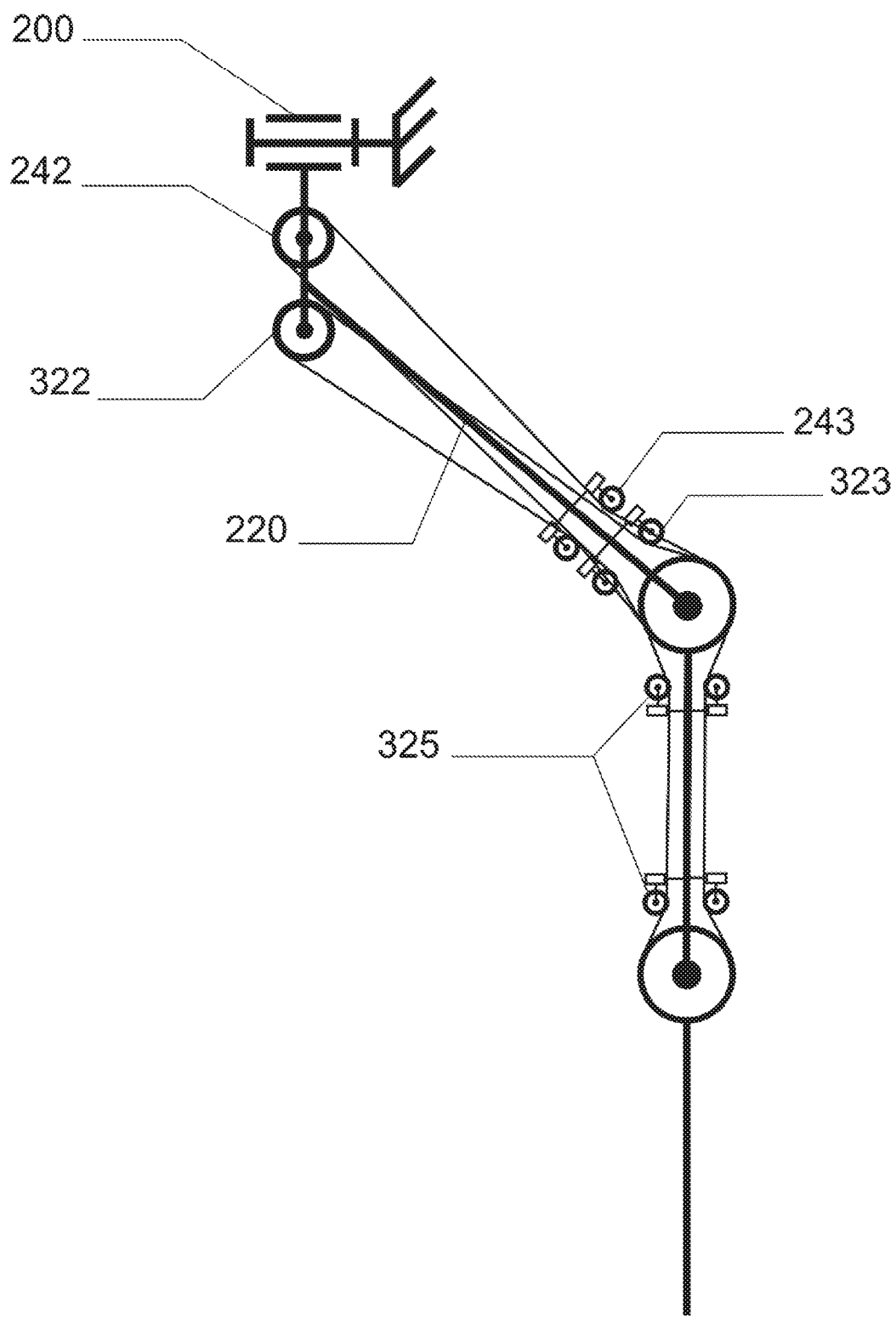
Figure 4C:
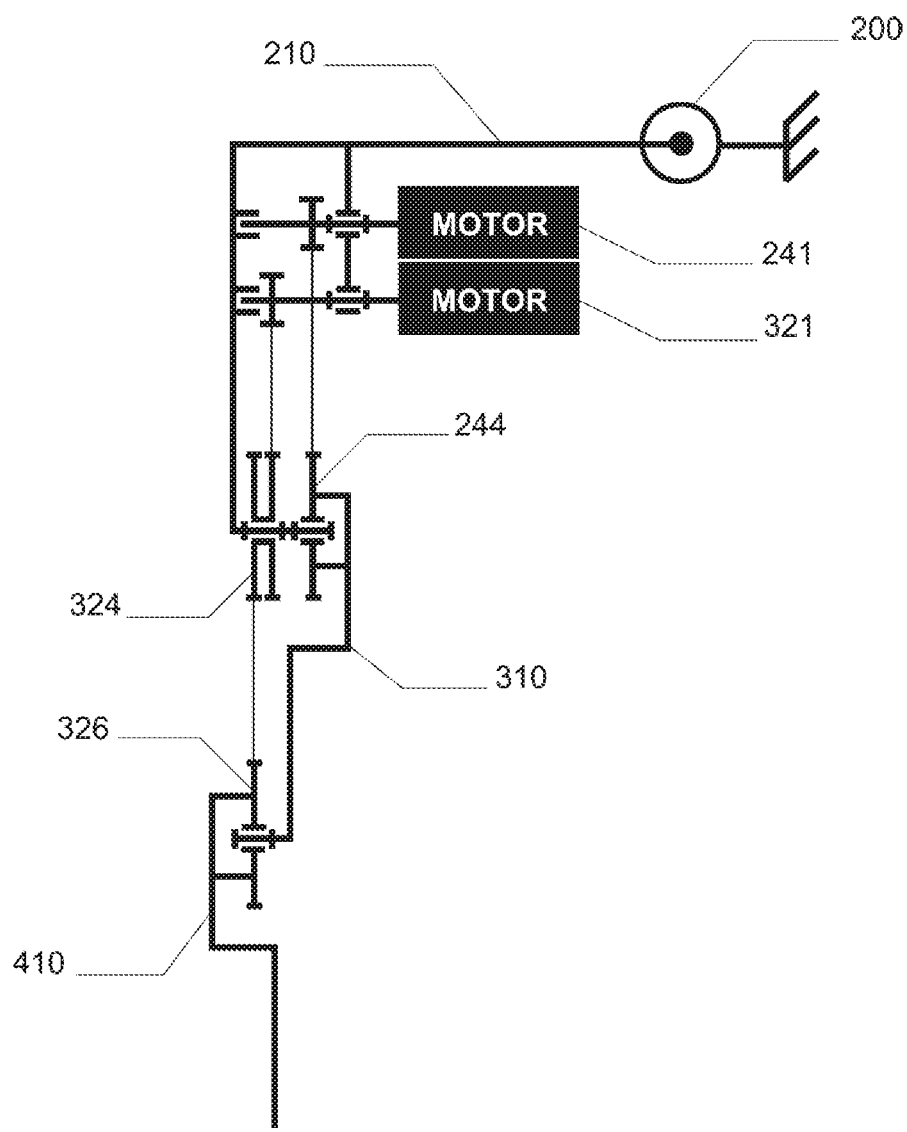

Elements 240 and 320 correspond to the actuation unit of first pivot element 300 and second pivot element 400 respectively and are detailed in FIGS. 4A to 4C. Motor units 241 and 321 corresponding to both pivot elements or joints 300 and 400 are fastened to first segment 210. A motor unit can comprise a motor, an angular sensor and a gear train all of them aligned on a single axis. A pulley with a helical groove such as elements 242 and 322 can be mounted on each motor unit axis which can be supported by ball bearings at each side of the pulley. A cable is enrolled with a minimum of 2, 5 turns over each pulley (242/322) and can possibly be anchored to the pulley using for example a screwed plate compressing the cable in the pulley groove.

For the actuation of joint 300, a cable/rope, that can be made of stainless steel, galvanized steel or other high rigidity solution, pass around pulley 242 and is anchored to both sides of a pulley 244 that can have two parallel grooves. This construction allows a range of motion of up to 200° (degrees). The ratio of radius between the pulleys 242 and 244 will act as a reductor which can multiply the torque from the motor unit of a factor from for example 2 to 10 times (currently we use a ratio of 3). Pulley 244 can then be fastened to the first leg segment 310 where both are mounted on a bearing (crossed roller bearing unit that allows a minimal width for a high stiffness in every direction).

The actuation unit of second pivot element 400 is similar to the actuation unit of joint 300 but comprises one more stage. The first stage along hip segment 220 transmits the torque from pulley 322 to a double pulley 324 on joint 300 with a cable/rope. The second stage along first leg segment 310 transmits the torque from the double pulley 324 on joint 300 to a pulley 326 on joint 400. Under this construction, joint 400 is coupled with joint 300 and the coupling ratio is dependent from the ratio of the radius of the pulley between pulleys 324 and 326. If a ratio of 1:1 is taken between the radius of pulleys 324 and 326, the orientation of segment 410 is then decoupled from joint 300 based on the world coordinate frame (external from the device). This property reproduces the biological characteristics of the hamstrings muscle which plays an important role and allows to reduce the power consumption in several activities related to mobility such as walking, ascending/descending stairs or sitting/standing up, etc.

In segment 220 each cable/rope is preloaded by at least one free pulley 243/323 or at least two if the cable is anchored on pulley 242/322. The free pulleys 243/323 and 325 can be adjustable in position through a pushing screw in order to set the preload on cable/rope in segment 220 and 310. A specific pulley arrangement is described in the following to easily adjust the length of the segment without having to modify the mechanics.

Figure 5:
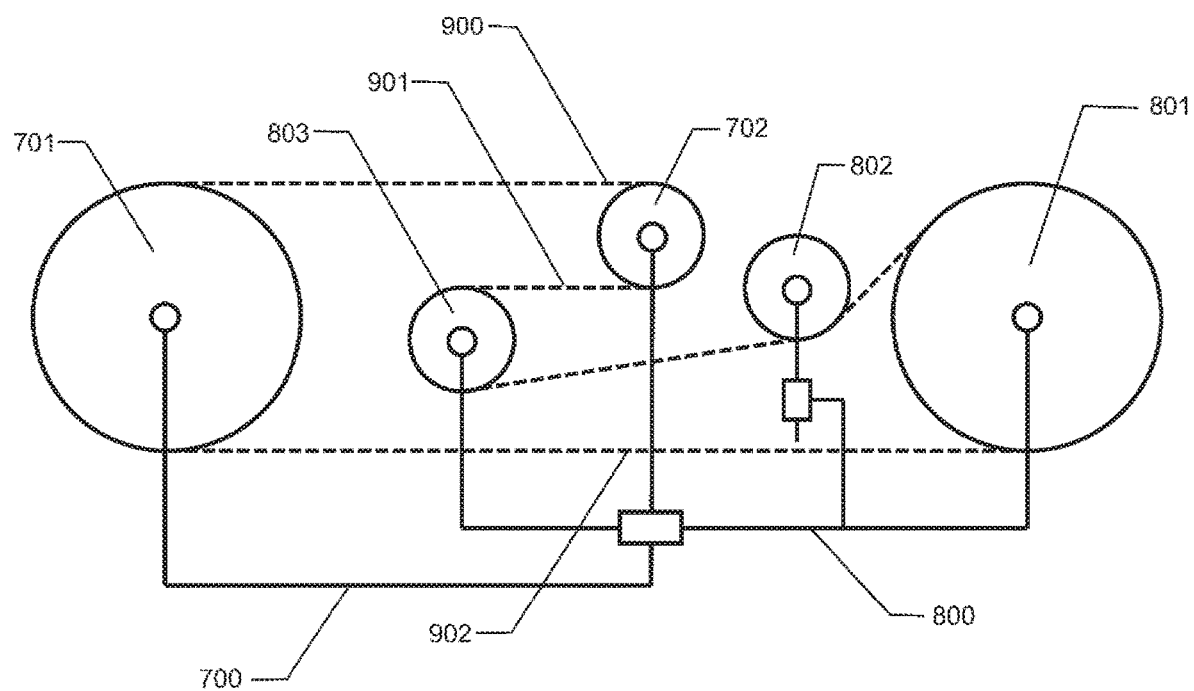
FIG. 5 illustrates a cable/rope-pulley system allowing easy segment adjustability in length according to an embodiment of the invention.

The adjustability in length of the segment may be realized without replacing the cables using the following mechanism including a cable/rope 900, a rigid assembly 700 and a rigid assembly 800 as illustrated in FIG. 5 for example. First assembly 700 includes a driving pulley 701 and a secondary pulley 702. second assembly 800 includes a driven pulley 801, a secondary pulley 803 and a tensioning pulley 802 that can slide along an axis and be locked to set the cable pre-load. Pulley 802 and 803 can be realized as one single pulley. Assembly 700 and 800 can slide relatively to each other to adjust the segment length, this along the same axis linking pulleys 701 to 801. As cable segment 901, between pulleys 702 and 803, and cable segment 902, between pulleys 701 and 801, are aligned with the axis of adjustability, the change of length of the segment will not affect the tension of the cable. This allows to adjust the length of segment 220 or 310 without changing the cables/rope length.

Actuation systems 240 and 320 can be replaced to lock joints 300 and/or 400 by replacing the motor axis 241/321 by locked axis that will lock pulleys 242/322. Actuation systems 240 and 320 can also be replaced by visco-elastic mechanisms by integrating a spring element in series with the cable/rope.

The presented structure presents 2 stages in parallel for the actuation of joints 300 and 400. A higher number of stages can be implemented in order to actuate the different rotations of the ankle, such as the plantar/dorsi-flexion, the internal/external rotation or the inversion/eversion.

Some advantages and some original features of embodiments of the present invention are summarized below.

Advantages
Modularity
Low inertia—high dynamics
Adjustability
Backdrivability
Freedom of motion
Compactness
Possible power and torques Original Features Over the Prior Art
Modular architecture
Actuators are remote from joints
Cable transmission All the examples and embodiments described in the present application are for illustration purposes and should not be construed in a limiting manner. The present invention encompasses many variations all within the scope and spirit of the invention. For example, embodiments described herein may be combined together and equivalent means may be used as well.

For example, because of the actuation by means of a cable, the system is effectively modular as it is easy to adapt it to the size of the wearer and taylor the structure to a wearer. One thus can produce standard structures that are adaptable to any wearer rather than unique structure for each wearer which is economically more interesting. Other equivalent actuation and transmission means may also be envisaged in the frame of the present invention: ropes, chains, cog wheels or a mix of them.

It is also possible to easily avoid the actuation of a joint or not, depending on the status of the wearer and if some specific exercises have to be made by the wearer. Some actuators (motors, cables) may not be used (for example they are rendered inoperative) or even not mounted on the structure. Such parts may also be mounted later, if needed, for example if the condition of the wearer worsens, without the need to construct/buy a new structure to replace the one used until then. The desired parts are activated or mounted on the structure again when needed.

The system may also be actuated on one side only or both sides depending on the condition of the wearer.

Exemplary embodiments have been described to provide an overall understanding of the principles of the structure, function, manufacture, and use of the devices and methods disclosed herein. One or more examples of these embodiments are illustrated in the accompanying drawings. Those skilled in the art will understand that the systems/devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. A number of problems with conventional methods and systems are noted herein and the methods and systems disclosed herein may address one or more of these problems. By describing these problems, no admission as to their knowledge in the art is intended. A person having ordinary skill in the art will appreciate that, although certain methods and systems are described herein with respect to an exoskeleton, the scope of the present invention is not so limited.

Moreover, while this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

BIBLIOGRAPHY/REFERENCES

[1] D, Blackwell, J. Lucas, and T. Clarke, "Summary health statistics for U.S. adults: National Health Interview Survey, 2012," National Center for Health Statistics, 2014.

[2] Y. Zhang, A.-M. Chapman, M. Plested, D. Jackson, and F. Purroy, "The Incidence, Prevalence, and Mortality of Stroke in France, Germany, Italy, Spain, the UK, and the US: A Literature Review," Stroke Research and Treatment, vol. 2012, p, e436125, March 2012.

[3] World Health Organization, Neurological Disorders: Public Health Challenges. WHO Press, 2006.

[4] G. Rosati, "The prevalence of multiple sclerosis in the world: an update," Neurol Sci, vol. 22, no. 2, pp. 117-139, April 2001.

[5] A. Singh, L. Tetreault, S. Kalsi-Ryan, A. Nouri, and M. G. Fehlings, "Global prevalence and incidence of traumatic spinal cord injury," Clin Epidemiol, vol. 6, pp. 309-331, September 2014.

[6] A. E. H. Emery, "Population frequencies of inherited neuromuscular diseases—A world survey," Neuromuscular Disorders, vol. 1, no. 1, pp. 19-29, 1991.

[7] M. Vukobratovic, D. Hristic, and Z. Stojiljkovic, "Development of active anthropomorphic exoskeletons," Med. & biol. Engng., vol. 12, no. 1, pp. 66-80, January 1974.

[8] R. Robotics, "German Social Court Ruling Deems ReWalk Exoskeleton Medically Necessary as Medical Aid for Recipient with Spinal Cord Injury." [Online]. Available: http://www.prnewswire.com/news-releasesi-german-social-courtruling-deems-rewalk-exoskeleton-medically-necessary-as-medicalaid-for-recipient-with-spinal-cord-injury-300308952.html.

[9] "Ekso Bionics Bestowed With CE Mark," Marketwire. [Online]. Available: http://www.marketwired.com/press-release/ekso-bionicsbestowed-with-ce-mark-1658229.htm.

[10] "TÜV Rheinland Issues EC certificate for Cyberdyne's Medical Robot Suit HAL® |jP| TÜV Rheinland." [Online]. Available: http://www.tuv.com/jp/japan/about us jp/press 2/news 1/news contentjp_en_168321.html.

[11] A. Ortlieb, M. Bouri, and H. Bleuler, "AUTONOMYO: Design Challenges of Lower Limb Assistive Device for Elderly People, Multiple Sclerosis and Neuromuscular Diseases," in Wearable Robotics: Challenges and Trends, Springer, Cham, 2017, pp. 439-443.

[12] M. Schenkman, R. A. Berger, P. O. Riley, R. W. Mann, and W. A. Hodge, "Whole-body movements during rising to standing from sitting," Phys Ther, vol. 70, no. 10, pp. 638-648; discussion 648-651, October 1990.

[13] M. K. Y. Mak, O. Levin, J. Mizrahi, and C. W. Y. Hui-Chan, "Joint torques during sit-to-stand in healthy subjects and people with Parkinson's disease," Clinical Biomechanics, vol. 18, no. 3, pp. 197-206, March 2003.

[14] D. A. Winter, "Kinematic and kinetic patterns in human gait: Variability and compensating effects," Human Movement Science, vol. 3, no. 1-2, pp. 51-76, March 1984.

[15] D. C. Kerrigan, L. W. Lee, J. J. Collins, P. O. Riley, and L. A. Lipsitz,

"Reduced hip extension during walking: Healthy elderly and fallers versus young adults," Archives of Physical Medicine and Rehabilitation, vol. 82, no. 1, pp. 26-30, January 2001.

[16] A. Roaas and G. B. J. Andersson, "Normal Range of Motion of the Hip, Knee and Ankle Joints in Male Subjects, 30-40 Years of Age," Acta Orthopaedica Scandinavica, vol. 53, no. 2, pp. 205-208, January 1982.

[17] S. Ounpuu, "The biomechanics of walking and running," Clin Sports Med, vol. 13, no. 4, pp. 843-863, October 1994.

[18] A. Ortlieb, J. Olivier, M. Bouri, T. Kuntzer, and H. Bleuler, "From gait measurements to design of assistive orthoses for people with neuromuscular diseases," presented at the ICORR, Singapore, 2015.

[19] A. G. Schache and R. Baker, "On the expression of joint moments during gait," Gait & Posture, vol. 25, no. 3, pp. 440-452, March 2007.

[20] J. Olivier, A. Ortlieb, M. Bouri, and H. Bleuler, "Mechanisms for actuated assistive hip orthoses," Robotics and Autonomous Systems, 2014.

[21] A. Protopapadaki, W. I. Drechsler, M. C. Cramp, F. J. Coutts, and O. M. Scott, "Hip, knee, ankle kinematics and kinetics during stair ascent and descent in healthy young individuals," Clinical Biomechanics, vol. 22, no. 2, pp. 203-210, February 2007.

[22] M. R. Tucker et al., "Control strategies for active lower extremity prosthetics and orthotics: a review," Journal of NeuroEngineering and Rehabilitation, vol. 12, p. 1, 2015.

[23] R. Baud, A. Ortlieb, J. Olivier, M. Bouri, and H. Bleuler, "HiBSO hip exoskeleton: Toward a wearable and autonomous design," presented at the MESROB, Graz, Austria, 2016.

[24] S. Rietdyk, A. E. Patla, D. A. Winter, M. G. Ishac, and C. E. Little, "Balance recovery from medio-lateral perturbations of the upper body during standing," Journal of Biomechanics, vol. 32, no. 11, pp. 1149-1158, November 1999.

[25] R. W. Bohannon, "Comfortable and maximum walking speed of adults aged 20-79 years: reference values and determinants," Age Ageing, vol. 26, no. 1, pp. 15-19, January 1997.

[26] G. Stoquart, C. Detrembleur, and T. Lejeune, "Effect of speed on kinematic, kinetic, electromyographic and energetic reference values during treadmill walking," Neurophysiologie Clinique/Clinical Neurophysiology, vol. 38, no. 2, pp. 105-116, April 2008.

[27] M. M. B. Morrow, W. J. Hurd, E. Fortune, V. Lugade, and K. R. Kaufman, "Accelerations of the Waist and Lower Extremities over a Range of Gait Velocities to Aid in Activity Monitor Selection for Field-Based Studies," J Appl Biomech, vol. 30, no. 4, pp. 581-585, August 2014.

What is claimed is:

1. An exoskeleton structure configured to be fastened to a body of a wearer and to provide motion to the body, the exoskeleton structure comprising:

a set of a plurality of joints including a first, second, and third pivot device;

a plurality of distal segments, the distal segments including, a first hip segment, a first segment linking the first pivot device with the first hip segment, and a first upper leg segment connecting the second pivot device with the third pivot device, the first upper leg segment being length adjustable and having an upper rigid assembly and a lower rigid assembly that are configured to slide relative to one other to shorten or lengthen the first upper leg segment, the upper rigid assembly having a first secondary pulley attached thereto, the lower rigid assembly having a second secondary pulley attached thereto, a first actuation device configured to actuate the first pivot device that is assimilated to a hip abduction and adduction motion of the wearer, a second actuation device configured to actuate the second pivot device that is assimilated to a hip flexion and extension motion of the wearer, and a third actuation device configured to actuate to the third pivot device assimilated to a knee flexion extension motion of the wearer, wherein each joint is configured to be unactuated, or to be constrained, or to be actuated by the first, second, and third actuation devices, and wherein the third actuation device includes a motor, a cable forming a loop through the first hip segment and the first upper leg segment, and a plurality of pulleys for supporting the cable, the cable and the plurality of pulleys configured to actuate the third pivot device via the motor and wherein a cable segment of the cable located between the first and second secondary pulleys of the first upper leg segment is adjustable in length with the slidable length adjusting of the first upper leg segment between the upper and lower rigid assembly.

2. The exoskeleton structure as defined in claim 1, wherein the exoskeleton structure forms a lower limb exoskeleton which is configured to be fastened to the wearer at a trunk with a brace and at a foot.

3. The exoskeleton structure as defined in claim 2, wherein the brace includes an adjustable attachment device.

4. The exoskeleton structure as defined in claim 1, wherein the first actuation device is located around a trunk of the wearer.

5. The exoskeleton structure as defined in claim 1, wherein the exoskeleton structure comprises two sets of the plurality of joints, arranged to support each leg of the wearer.

6. The exoskeleton structure as defined in claim 1, further comprising:
a set of visco-elastic devices to provide for a constraint to corresponding joints.

7. The exoskeleton structure as defined in claim 1, wherein the exoskeleton structure is configured such that a rotation around a longitudinal axis is unobstructed to authorize a rotation of a hip or of an ankle of the wearer.

8. The exoskeleton structure as defined in claim 1, further comprising:
a body shaped soft interface configured to be arranged between the exoskeleton structure and the wearer at a location under a knee of the wearer and/or along a thigh of the wearer.

9. A method using an exoskeleton structure as defined in claim 1, comprising the steps of:
fitting the exoskeleton structure to the wearer; and
operating the exoskeleton structure to assist the wearer in walking.

10. The exoskeleton structure as defined in claim 1, where the distal segments further include:
a foot element; and
a second segment connecting the third pivot device to the foot element.

11. The exoskeleton structure as defined in claim 1, further comprising:
an upper physical interface located at the upper section and including an adjustable attachment device configured to attach to the trunk of the wearer and
a hip adduction and abduction mechanism including a four-bar linkage including the first pivot device, two additional pivot joints, and a helical joint,
wherein the first actuation device includes a first motor that is configured to actuate the helical joint to thereby actuate the first pivot device via the four-bar linkage.

12. The exoskeleton structure as defined in claim 1, wherein the motor is configured impart a kinematic coupling between the second and the third pivot device with the cable.

13. The exoskeleton structure as defined in claim 1, wherein the second actuation device includes a second motor, a cable forming a loop through the first hip segment, and a plurality of pulleys for supporting the cable, the cable and the plurality of pulleys configured to actuate the second pivot device via the second motor.

14. The exoskeleton structure as defined in claim 1, wherein the motor is operatively connected to rotate a pulley from the plurality of pulleys at an upper end of the first hip segment, the cable wound around the pulley.

15. An exoskeleton structure configured to be fastened to a body of a wearer and to provide motion to the body, the exoskeleton structure comprising:
a set of a plurality of joints including a first, second, and third pivot device;
an upper physical interface located at an upper section of the exoskeleton structure and including an adjustable attachment device configured to attach to a trunk of the wearer;
an actuation system configured to actuate the plurality of joints of the exoskeleton structure and located at the upper physical interface to decrease inertia and mass on distal segments of the exoskeleton structure, the actuation system including
first actuation device configured to actuate the first pivot device that is assimilated to a hip abduction and adduction motion of the wearer,
a second actuation device configured to actuate the second pivot device that is assimilated to a hip flexion and extension motion of the wearer, and
a third actuation device configured to actuate to the third pivot device assimilated to a knee flexion extension motion of the wearer; and
a hip adduction and abduction mechanism including a four-bar linkage including the first pivot device, first and second pivot joints, and a helical joint,
actuation device includes a motor that is configured to actuate the helical joint to thereby actuate the first pivot device via the four-bar linkage.

16. The exoskeleton structure according to claim 15, wherein the second actuation device includes a second motor, a cable forming a loop through the first hip segment, and a plurality of pulleys for supporting the cable, the cable and the plurality of pulleys configured to actuate the second pivot device via the second motor.

17. The exoskeleton structure according to claim 15, wherein the third actuation device includes a third motor, a cable forming a loop through the first hip segment and the first upper leg segment, and a plurality of pulleys for supporting the cable, the cable and the plurality of pulleys configured to actuate the third pivot device via the third motor.

18. The exoskeleton structure as defined in claim 17, wherein the third motor is operatively connected to rotate a pulley from the plurality of pulleys at an upper end of the first hip segment, the cable wound around the pulley.

19. The exoskeleton structure as defined in claim 17, wherein the first upper leg segment is length adjustable, the first upper leg segment having an upper rigid assembly and a lower rigid assembly that are configured to slide relative to one other to shorten or lengthen the first upper leg segment, the upper rigid assembly having a first secondary pulley attached thereto, the lower rigid assembly having a second secondary pulley attached thereto, a cable segment of the cable located between the first and second secondary pulleys being adjustable in length with the slidable length adjusting between the upper and lower rigid assembly.

\* \* \* \* \*